US012806921B2

(12) United States Patent
Kamada et al.

(10) Patent No.: US 12,806,921 B2
(45) Date of Patent: Nov. 24, 2026

(54) METHOD AND SYSTEM FOR EXECUTING DISCRIMINATION PROCESS OF PRINTING MEDIUM USING MACHINE LEARNING MODEL

(71) Applicant: SEIKO EPSON CORPORATION, Tokyo (JP)

(72) Inventors: Takahiro Kamada, Matsumoto (JP); Ryoki Watanabe, Matsumoto (JP); Satoru Ono, Shiojiri (JP); Kenji Matsuzaka, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 1243 days.

(21) Appl. No.: 17/645,324

(22) Filed: Dec. 21, 2021

(65) Prior Publication Data

US 2022/0194099 A1 Jun. 23, 2022

(30) Foreign Application Priority Data

Dec. 23, 2020 (JP) ................................ 2020-213538
Mar. 1, 2021 (JP) ................................ 2021-031439
Mar. 1, 2021 (JP) ................................ 2021-031440

(51) Int. Cl.
*B41J 11/00* (2006.01)
*B41J 11/42* (2006.01)
(Continued)

(52) U.S. Cl.
CPC .............. *B41J 11/009* (2013.01); *B41J 11/42* (2013.01); *G05B 2219/45187* (2013.01);
(Continued)

(58) Field of Classification Search
CPC ..................... B41J 11/009; B41J 11/42; G05B 2219/45187; G06F 3/1293; G06F 18/23; G06N 20/00; G06N 20/20
See application file for complete search history.

(56) References Cited

U.S. PATENT DOCUMENTS 6,425,650 B1 * 7/2002 Walker ..................... B41J 2/125 347/14
10,387,740 B2 8/2019 Yang et al.
(Continued)

FOREIGN PATENT DOCUMENTS

JP 2006-154913 A 6/2006
JP 2019-055554 A 4/2019
(Continued)

OTHER PUBLICATIONS

Kumar et al., "Discrimination of Various Paper Types Using Diffuse Reflectance Ultraviolet-Visible Near-Infrared (UV-Vis-NIR) Spectroscopy: Forensic Application to Questioned Documents" 2015, Applied Spectroscopy, pp. 714-720. (Year: 2015).*
(Continued)

*Primary Examiner* — Chase P. Hinckley
(74) *Attorney, Agent, or Firm* — Spencer Fane LLP

(57) ABSTRACT

A method for executing a discrimination process of a printing medium includes a step (a) of preparing N machine learning models when N is an integer of 1 or more, a step (b) of acquiring target spectral data which is a spectral reflectance of a target printing medium, and a step (c) of discriminating a type of the target printing medium by executing a class classification process of the target spectral data using the N machine learning models.

9 Claims, 26 Drawing Sheets

(51) Int. Cl.

| | |
|---|---|
| *G06F 3/12* | (2006.01) |
| *G06F 18/23* | (2023.01) |
| *G06N 20/00* | (2019.01) |
| *G06N 20/20* | (2019.01) |

(52) U.S. Cl.
CPC ............ *G06F 3/1293* (2013.01); *G06F 18/23* (2023.01); *G06N 20/00* (2019.01); *G06N 20/20* (2019.01)

(56) References Cited

U.S. PATENT DOCUMENTS

| | | | | |
|---|---|---|---|---|
| 10,831,417 | B1 * | 11/2020 | Su | G06F 3/1208 |
| 11,275,928 | B2 | 3/2022 | Rassool | |
| 2002/0156754 | A1 * | 10/2002 | Swimm | B41J 11/009 706/20 |
| 2003/0132366 | A1 * | 7/2003 | Gao | B41J 11/009 250/208.1 |
| 2007/0263265 | A1 * | 11/2007 | Sekine | H04N 1/603 358/518 |
| 2008/0294363 | A1 * | 11/2008 | Parmar | G03G 15/0131 399/301 |
| 2011/0282613 | A1 * | 11/2011 | Skinner | G01J 3/50 702/104 |
| 2012/0148150 | A1 * | 6/2012 | Takahashi | G06V 10/56 382/162 |
| 2012/0218574 | A1 * | 8/2012 | Fukuda | H04N 1/6033 358/1.9 |
| 2013/0127946 | A1 * | 5/2013 | Kanai | B41J 29/393 347/19 |
| 2013/0129143 | A1 * | 5/2013 | Chen | G06F 18/24 382/103 |
| 2015/0339558 | A1 * | 11/2015 | Kanai | B41J 11/009 358/1.6 |
| 2019/0098142 | A1 | 3/2019 | Ozawa | |
| 2019/0102701 | A1 | 4/2019 | Singaraju et al. | |
| 2019/0260902 | A1 * | 8/2019 | Eiyama | H04N 1/6044 |
| 2019/0360942 | A1 | 11/2019 | Kano et al. | |
| 2020/0210721 | A1 | 7/2020 | Goel et al. | |
| 2020/0249892 | A1 | 8/2020 | Shikagawa et al. | |
| 2020/0269573 | A1 * | 8/2020 | Lin | G06N 20/00 |
| 2020/0276835 | A1 * | 9/2020 | Kasamatsu | B41J 11/0095 |
| 2020/0285934 | A1 | 9/2020 | Hinton et al. | |
| 2020/0314276 | A1 * | 10/2020 | Igarashi | H04N 1/00724 |
| 2020/0314290 | A1 * | 10/2020 | Yokouchi | H04N 1/54 |
| 2020/0336802 | A1 | 10/2020 | Russell et al. | |
| 2021/0223031 | A1 * | 7/2021 | Lee | G06V 40/165 |
| 2021/0280169 | A1 | 9/2021 | Suzuki et al. | |
| 2021/0357674 | A1 * | 11/2021 | Ogawa | G06V 10/22 |
| 2022/0092369 | A1 * | 3/2022 | Yokouchi | H04N 1/6097 |
| 2022/0100477 | A1 | 3/2022 | Mosko et al. | |
| 2022/0131998 | A1 * | 4/2022 | Morovic | G06N 20/20 |

FOREIGN PATENT DOCUMENTS

| | | | | |
|---|---|---|---|---|
| JP | 2019-204321 A | | 11/2019 | |
| JP | 2020-121503 A | | 8/2020 | |
| JP | 7479925 B2 | * | 5/2024 | G06N 3/09 |

OTHER PUBLICATIONS

Nebouy et al., "Prediction of the spectral reflectance of laser-generated color prints by combination of an optical model and learning methods" Aug. 19, 2015, pp. 1661-1671. (Year: 2015).*
Bianchi et al., "Spectral Clustering with Graph Neural Networks for Graph Pooling" Jun. 3, 2020, arXiv: 1907.00481v3, pp. 1-13. (Year: 2020).*
Shaham et al., "SpectralNet: Spectral Clustering using Deep Neural Networks" Apr. 4, 2018, arXiv: 1801.01587, pp. 1-21. (Year: 2018).*
Zuffi, Silvia, "Spectral-based printer modeling and characterization" 2005, pp. 1-9. (Year: 2005).*
Ferreira et al., "Data-Driven Feature Characterization Techniques for Laser Printer Attribution" 2017, pp. 1860-1873. (Year: 2017).*
Zhao et al., "Hyperspectral Imaging with Random Printed Mask" 2019, pp. 10149-10157. (Year: 2019).*
Joshi et al., "Source Printer Identification from Document Images Acquired using Smartphone" Mar. 27, 2020, pp. 1-10. (Year: 2020).*
Zhuo et al., "SCSP: Spectral Clustering Filter Pruning with Soft Self-adaption Manners" Jun. 14, 2018, arXiv: 1806.05320v1, pp. 1-14. (Year: 2018).*
Huang et al., "Ultra-Scalable Spectral Clustering and Ensemble Clustering" Mar. 5, 2019, arXiv: 1903.01057v2, pp. 1-15. (Year: 2019).*
Shi et al., "Deep Multispectral Painting Reproduction via Multi-Layer, Custom-Ink Printing" Nov. 2018, pp. 1-15. (Year: 2018).*
Devassy et al., "Comparison of Ink Classification Capabilities of Classic Hyperspectral Similarity Features" 2019, pp. 25-30. (Year: 2019).*
Saragadam et al., "Programmable Spectrometry—Per-Pixel Classification of Materials using Learned Spectral Filters" May 13, 2019, arXiv: 1905.04815v1, pp. 1-12. (Year: 2019).*
Li et al., "Global Node Attentions via Adaptive Spectral Filters" Sep. 28, 2020, Anonymous (openReview), pp. 1-16. (Year: 2020).*
Monakhova et al., "Spectral DiffuserCam: lensless snapshot hyperspectral imaging with a spectral filter array" Oct. 2020, pp. 1298-1307. (Year: 2020).*
Ansari et al., "Mixed Integer Ink Selection for Spectral Reproduction" Nov. 27, 2020, pp. 1-16. (Year: 2020).*
Ho et al., "A multi-one-class dynamic classifier for adaptive digitization of document streams" May 18, 2017, pp. 137-154. (Year: 2017).*
Hafiz et Bhat, "Fast Training of Deep Networks with One-Class CNNs" Jul. 22, 2020, arXiv: 2007.00046v2, pp. 1-11. (Year: 2020).*
Cherian et Wang, "Generalized One-Class Learning using Pairs of Complementary Classifiers" Jun. 24, 2021, arXiv: 2106.13272v1, pp. 1-16. (Year: 2021).*
Ahmad et Bezawada, "One-Class Classification by Ensembles of Regression models—a detailed study" Mar. 7, 2020, arXiv: 1912.11475v3, pp. 1-9. (Year: 2020).*
Ogawa et al., "Image Processing System, Image Processing Method, and Storage Medium Each for Obtaining Pixels of Object Using Neural Network" May 14, 2020, Provisional filing 2020-085350, WIPO Digital Access Service, pp. i-85. (Year: 2020).*

* cited by examiner

FIG. 7

IDL

| MEDIUM IDENTIFIER | MEDIUM NAME | DATA SUB No. | SPECTRAL DATA |
|---|---|---|---|
| A-1 | MEDIUM 1 | 0 | ........................................ |
| | | 1 | ........................................ |
| | | 2 | ........................................ |
| A-2 | MEDIUM 2 | 0 | ........................................ |
| | | 1 | ........................................ |
| | | 2 | ........................................ |
| ... | ... | ... | ........................................ |
| A-16 | MEDIUM 16 | 0 | ........................................ |
| | | 1 | ........................................ |
| | | 2 | ........................................ |

FIG. 8

PST

| MEDIUM IDENTIFIER | PRINT SETTING | | |
|---|---|---|---|
| | PRINTER PROFILE | MEDIUM FEEDING SPEED | DRYING TIME |
| A-1 | PR1 | FS1 | DT1 |
| A-2 | PR2 | FS2 | DT2 |
| ... | ... | ... | ... |
| ... | ... | ... | ... |
| A-16 | PR16 | FS16 | DT16 |

FIG. 10

GT1

| GROUP No. | MEDIUM IDENTIFIER | DATA SUB No. | DISTANCE FROM REPRESENTATIVE POINT | MODEL NUMBER | CLASS LABEL | EXISTING AREA | REPRESENTATIVE POINT |
|---|---|---|---|---|---|---|---|
| 1 | A-1 | 0 | 0.02 | 201 | 1 | FOR TRAINING | G1 |
| 1 | | 1 | 0.02 | | | | |
| 1 | | 2 | 0.03 | | | | |
| 1 | A-2 | 0 | 0.10 | 201 | 2 | | |
| 1 | | 1 | 0.11 | | | | |
| 1 | | 2 | 0.13 | | | | |
| 1 | ... | ... | ... | ... | ... | | |
| 1 | A-10 | 0 | 0.53 | 201 | 10 | | |
| 1 | | 1 | 0.50 | | | | |
| 1 | | 2 | 0.51 | | | | |

GT2

| GROUP No. | MEDIUM IDENTIFIER | DATA SUB No. | DISTANCE FROM REPRESENTATIVE POINT | MODEL NUMBER | CLASS LABEL | EXISTING AREA | REPRESENTATIVE POINT |
|---|---|---|---|---|---|---|---|
| 2 | A-11 | 0 | 0.04 | 202 | 1 | FOR TRAINING | G2 |
| 2 | | 1 | 0.03 | | | | |
| 2 | | 2 | 0.03 | | | | |
| 2 | A-12 | 0 | 0.14 | 202 | 2 | | |
| 2 | | 1 | 0.13 | | | | |
| 2 | | 2 | 0.15 | | | | |
| 2 | ... | ... | ... | ... | ... | | |
| 2 | A-16 | 0 | 0.64 | 202 | 6 | | |
| 2 | | 1 | 0.63 | | | | |
| 2 | | 2 | 0.66 | | | | |

KS1_ConvVN1 KS1_ConvVN2 KS1_ClassVN

| No. | LAYER NAME | LABEL Lb | KNOWN FEATURE SPECTRUM KSp |
|---|---|---|---|
| 1 | ConvVN1 | 1 | ........................................ |
| 2 | ConvVN1 | 1 | ........................................ |
| ... | ... | ... | ........................................ |
| N1_1max | ConvVN1 | 1 | ........................................ |
| 1 | ConvVN1 | 2 | ........................................ |
| 2 | ConvVN1 | 2 | ........................................ |
| ... | ... | ... | ........................................ |
| N1_2max | ConvVN1 | 2 | ........................................ |
| ... | ... | ... | ........................................ |
| ... | ... | ... | ........................................ |
| N1_n1max | ConvVN1 | n1 | ........................................ |

FIG. 16

IDL

<STATE S2>

| MEDIUM IDENTIFIER | MEDIUM NAME | DATA SUB No. | SPECTRAL DATA |
|---|---|---|---|
| A-1 | MEDIUM 1 | 0 | .............................................. |
| | | 1 | .............................................. |
| | | 2 | .............................................. |
| A-2 | MEDIUM 2 | 0 | .............................................. |
| | | 1 | .............................................. |
| | | 2 | .............................................. |
| ... | ... | ... | .............................................. |
| A-16 | MEDIUM 16 | 0 | .............................................. |
| | | 1 | .............................................. |
| | | 2 | .............................................. |
| B-1 | ADDITIONAL MEDIUM 1 | 0 | .............................................. |
| | | 1 | .............................................. |
| | | 2 | .............................................. |

FIG. 17

GT2

<STATE S2>

| GROUP No. | MEDIUM IDENTIFIER | DATA SUB No. | DISTANCE FROM REPRESENTATIVE POINT | MODEL NUMBER | CLASS LABEL | EXISTING AREA | REPRESENTATIVE POINT |
|---|---|---|---|---|---|---|---|
| 2 | B-1 | 0 | 0.08 | 202 | 1 | FOR TRAINING | G2 |
| 2 | | 1 | 0.09 | | | | |
| 2 | | 2 | 0.09 | | | | |
| 2 | A-11 | 0 | 0.04 | 202 | 2 | | |
| 2 | | 1 | 0.03 | | | | |
| 2 | | 2 | 0.03 | | | | |
| 2 | A-12 | 0 | 0.14 | 202 | 3 | | |
| 2 | | 1 | 0.13 | | | | |
| 2 | | 2 | 0.15 | | | | |
| ... | ... | ... | ... | ... | ... | | |
| 2 | A-16 | 0 | 0.64 | 202 | 7 | | |
| 2 | | 1 | 0.63 | | | | |
| 2 | | 2 | 0.66 | | | | |

FIG. 18

GT2

<STATE S6>

| GROUP No. | MEDIUM IDENTIFIER | DATA SUB No. | DISTANCE FROM REPRESENTATIVE POINT | MODEL NUMBER | CLASS LABEL | EXISTING AREA | REPRESENTATIVE POINT |
|---|---|---|---|---|---|---|---|
| 2 | B-1 | 0 | 0.08 | 202 | 1 | FOR TRAINING | G2a |
| 2 | | 1 | 0.09 | | | | |
| 2 | | 2 | 0.09 | | | | |
| ... | ... | ... | ... | ... | ... | | |
| 2 | B-10 | 0 | 0.39 | 202 | 10 | | |
| 2 | | 1 | 0.38 | | | | |
| 2 | | 2 | 0.38 | | | | |
| 2 | A-11 | 0 | 0.04 | 202 | - | FOR SAVING | |
| 2 | | 1 | 0.03 | | | | |
| 2 | | 2 | 0.03 | | | | |
| ... | ... | ... | ... | ... | - | | |
| 2 | A-16 | 0 | 0.64 | 202 | - | | |
| 2 | | 1 | 0.63 | | | | |
| 2 | | 2 | 0.66 | | | | |
| 2 | B-11 | 0 | 0.15 | 203 | 1 | FOR TRAINING | G2b |
| 2 | | 1 | 0.14 | | | | |
| 2 | | 2 | 0.13 | | | | |
| 2 | A-11 | 0 | 0.04 | 203 | 2 | | |
| 2 | | 1 | 0.03 | | | | |
| 2 | | 2 | 0.03 | | | | |
| ... | ... | ... | ... | ... | ... | | |
| 2 | A-16 | 0 | 0.64 | 203 | 7 | | |
| 2 | | 1 | 0.63 | | | | |
| 2 | | 2 | 0.66 | | | | |

METHOD AND SYSTEM FOR EXECUTING DISCRIMINATION PROCESS OF PRINTING MEDIUM USING MACHINE LEARNING MODEL

The present application is based on, and claims priority from JP Application Serial Number 2020-213538, filed Dec. 23, 2020, JP Application Serial Number 2021-31439, filed Mar. 1, 2021, and JP Application Serial Number 2021-31440, filed Mar. 1, 2021, the disclosure of which are hereby incorporated by reference herein in its entirety.

BACKGROUND

1. Technical Field

The present disclosure relates to a method and system for executing a discrimination process of a printing medium using a machine learning model.

2. Related Art

JP-A-2019-55554 discloses a technology for detecting a printing medium using a medium detection sensor and selecting print settings of a medium associated with attribute information that can be acquired by the medium detection sensor. The medium detection sensor is composed of an optical sensor.

However, there was a problem in JP-A-2019-55554 that printing media having similar optical characteristics cannot be discriminated because the detection result of the optical medium detection sensor is determined whether to be within a constant allowable range.

In addition, JP-A-2020-121503 proposes a technology for discriminating, using a machine learning model, a plurality of types of printing media used in a recording apparatus such as a printer. However, management was not made whether or not the stored training data has been learned, and thus there was room for improvement. Specifically, it is described that the machine learning process may be executed at any timing after a predetermined amount of training data is stored, but the management whether or not the stored training data has been learned was not made. In other words, there is a demand for a technology capable of identifying whether or not the stored data has been learned.

Further, the discrimination accuracy of the discriminator was not managed, and thus there was room for improvement. Specifically, it is described in the machine learning process that correspondence between the medium data and the type of printing medium is not accurate at the initial stage, and is optimized in the process of the machine learning. However, the discrimination accuracy of the discriminator is not described. That is, a technology capable of grasping the discrimination accuracy of the discriminator has been required.

SUMMARY

A method for executing a discrimination process of a printing medium using a machine learning model according to the present disclosure includes a step (a) of preparing N machine learning models when N is an integer of 1 or more, in which each of the N machine learning models is configured to discriminate a type of the printing medium by classifying input spectral data, which is a spectral reflectance of the printing medium, into any one of a plurality of classes, a step (b) of acquiring target spectral data which is a spectral reflectance of a target printing medium, and a step (c) of discriminating a type of the target printing medium by executing a class classification process of the target spectral data using the N machine learning models.

A system for executing a discrimination process of a printing medium using the machine learning model according to the present disclosure includes a memory that stores N machine learning models when N is an integer of 1 or more, and a processor that executes the discrimination process using the N machine learning models. Each of the N machine learning models is configured to discriminate a type of the printing medium by classifying input spectral data, which is a spectral reflectance of the printing medium, into any one of a plurality of classes. The processor is configured to execute a first process of acquiring target spectral data of a target printing medium and a second process of discriminating a type of the target printing medium by executing a class classification process of the target spectral data using the N machine learning models.

A recording apparatus according to the present disclosure includes a storage section that stores physical information of a recording medium and a recording parameter corresponding to type information of the recording medium, a recording section that performs recording based on the recording parameter, a learning section that obtains a discriminator that was machine-learned using the physical information of the recording medium and the type information of the recording medium, and a learning state determination section that determines whether or not the recording medium is a recording medium using the machine learning of the discriminator.

A method for discriminating the recording medium according to the present disclosure is a method for performing a discrimination process of the recording medium using a machine learning model, and includes obtaining a discriminator that has N machine learning models when N is an integer of 1 or more and has been machine-learned using physical characteristics of the recording medium and type information of the recording medium for each of the N machine learning models, determining whether or not the recording medium is a recording medium used for the machine learning, and displaying the determination result.

A recording system according to the present disclosure includes a learning section that obtains a discriminator that has been machine-learned using physical characteristics of the recording medium and type information of the recording medium, and an accuracy evaluation section that obtains a discrimination accuracy of the discriminator.

A method for confirming the discrimination accuracy according to the present disclosure is a method for confirming a discrimination accuracy in the discrimination process of the recording medium using the machine learning model, and includes obtaining a discriminator that has N machine learning models when N is an integer of 1 or more and has been machine-learned using physical characteristics of the recording medium and type information of the recording medium for each of the N machine learning models, obtaining the discrimination accuracy using an accuracy evaluation data different from the physical characteristics of the recording medium used for the machine learning, and displaying the discrimination accuracy.

BRIEF DESCRIPTION OF THE DRAWINGS

FIG. 7 is an explanatory diagram illustrating a medium identifier list.

FIG. 8 is an explanatory diagram illustrating a print setting table.

FIG. 10 is an explanatory diagram illustrating a group management table.

FIG. 16 is an explanatory diagram illustrating a medium identifier list updated in accordance with addition of the printing medium.

FIG. 17 is an explanatory diagram illustrating a group management table updated in accordance with addition of the printing medium.

FIG. 18 is an explanatory diagram illustrating a group management table updated in accordance with addition of the machine learning model.

DESCRIPTION OF EXEMPLARY EMBODIMENTS

1. First Embodiment

*Overview of Printing System*

Figure 1:
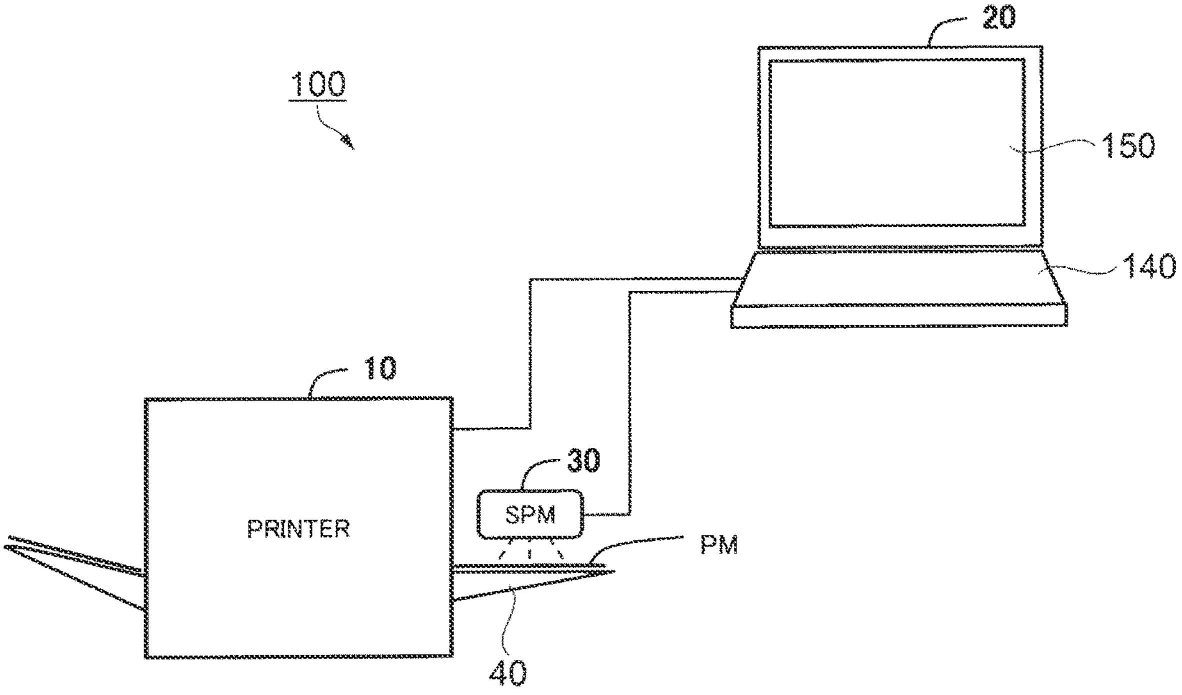
FIG. 1 is a schematic configuration diagram of a printing system according to an embodiment.
Figure 2:
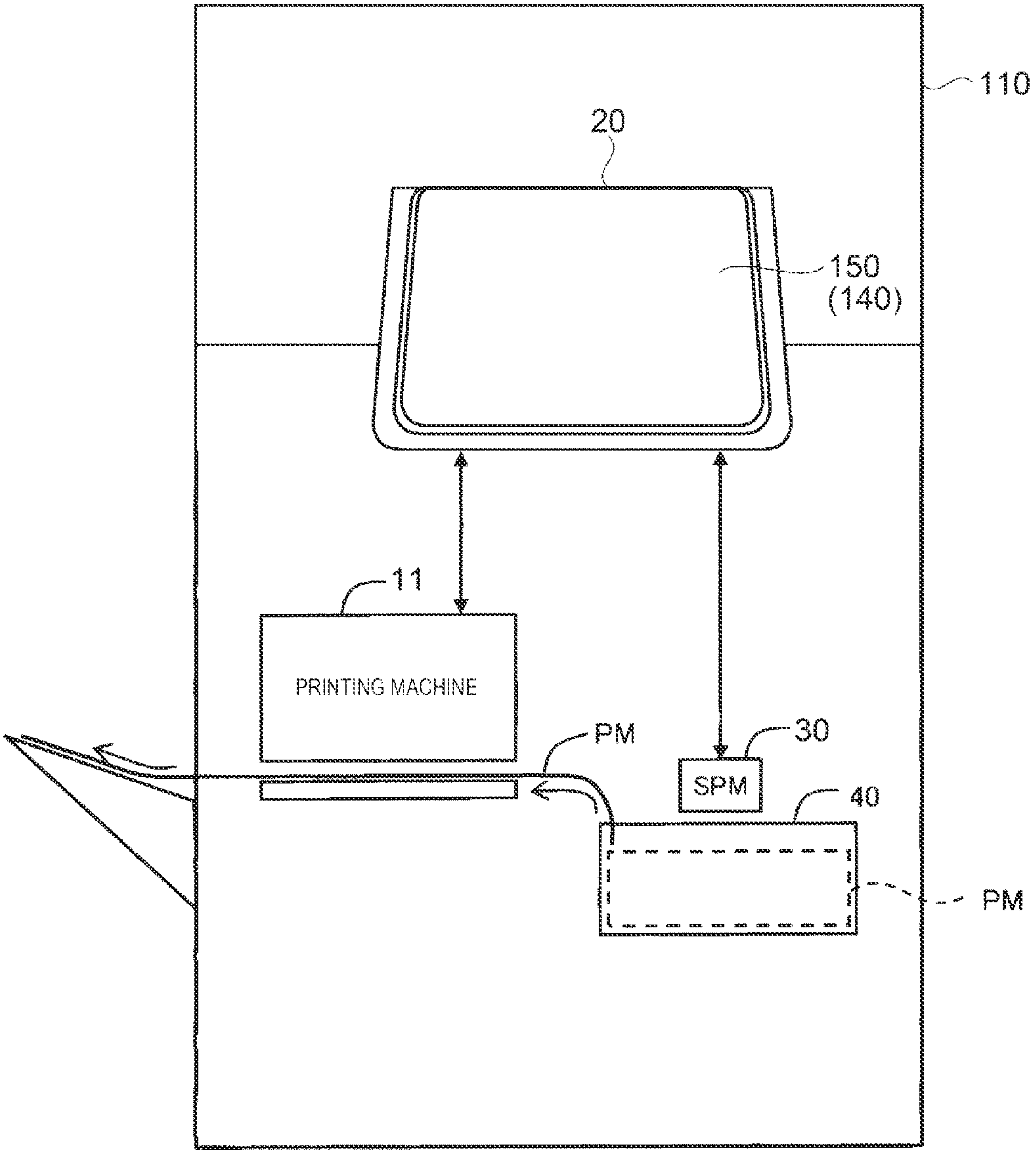
FIG. 2 is a schematic configuration diagram of a printing apparatus.

FIG. 1 is a schematic configuration diagram showing a printing system 100 according to an embodiment. FIG. 2 is a schematic configuration diagram of a printing apparatus 110.

The printing system 100 as a recording system includes a printer 10 as a recording section, an information processing device 20, a spectrometer 30, and the like. The spectrometer 30 can acquire a spectral reflectance as physical information by performing spectrometry on a printing medium PM as a recording medium used in the printer 10 in an unprinted state. In the present disclosure, the spectral reflectance is also referred to as "spectral data". The spectrometer 30 includes, for example, a tunable interference spectral filter and a monochrome image sensor. The spectral data obtained by the spectrometer 30 is used as input data to a machine learning model to be described later. As will be described later, the information processing device 20 executes a class classification process of the spectral data using the machine learning model, and classifies which of a plurality of classes the printing medium PM corresponds to. The "class of printing medium PM" means a type of printing medium PM. The information processing device 20 controls the printer 10 so as to perform printing under appropriate printing conditions according to the type of the printing medium PM. In a preferred example, the information processing device 20 uses a notebook PC that is easy to carry. In addition, the printing medium PM includes a roll medium in which the printing medium is wound around a roll-shaped core material. In the present embodiment, printing is given as an example of recording, but it can be applied to a recording system, apparatus, and method in a broad sense including fixing, in which recording conditions need to be changed according to physical information of a medium.

In the description above, the printer 10, the information processing device 20, and the spectrometer 30 are configured separately, but are not limited to the configuration, and any configuration having these functions may be used. For example, as illustrated in FIG. 2, the information processing device 20 and the spectrometer 30 may be incorporated in the printing apparatus 110 as a recording apparatus.

Specifically, the printing apparatus 110 includes the information processing device 20, a printing machine 11 as a recording section, the spectrometer 30, a printing medium holder 40, and the like. The printing medium holder 40 houses the printing medium PM, and the spectrometer 30 performs spectrometry on the printing medium PM housed in the printing medium holder 40 and acquires spectroscopic spectrum data. The printing machine 11 is a printing machine similar to the printing machine included in the printer 10. In a preferred example, the information processing device 20 is a tablet PC provided with a touch panel, and is incorporated in the printing apparatus 110 with a display section 150 exposed. Such a printing apparatus 110 functions in the same manner as the printing system 100.

*Overview of Information Processing Device*

Figure 3:
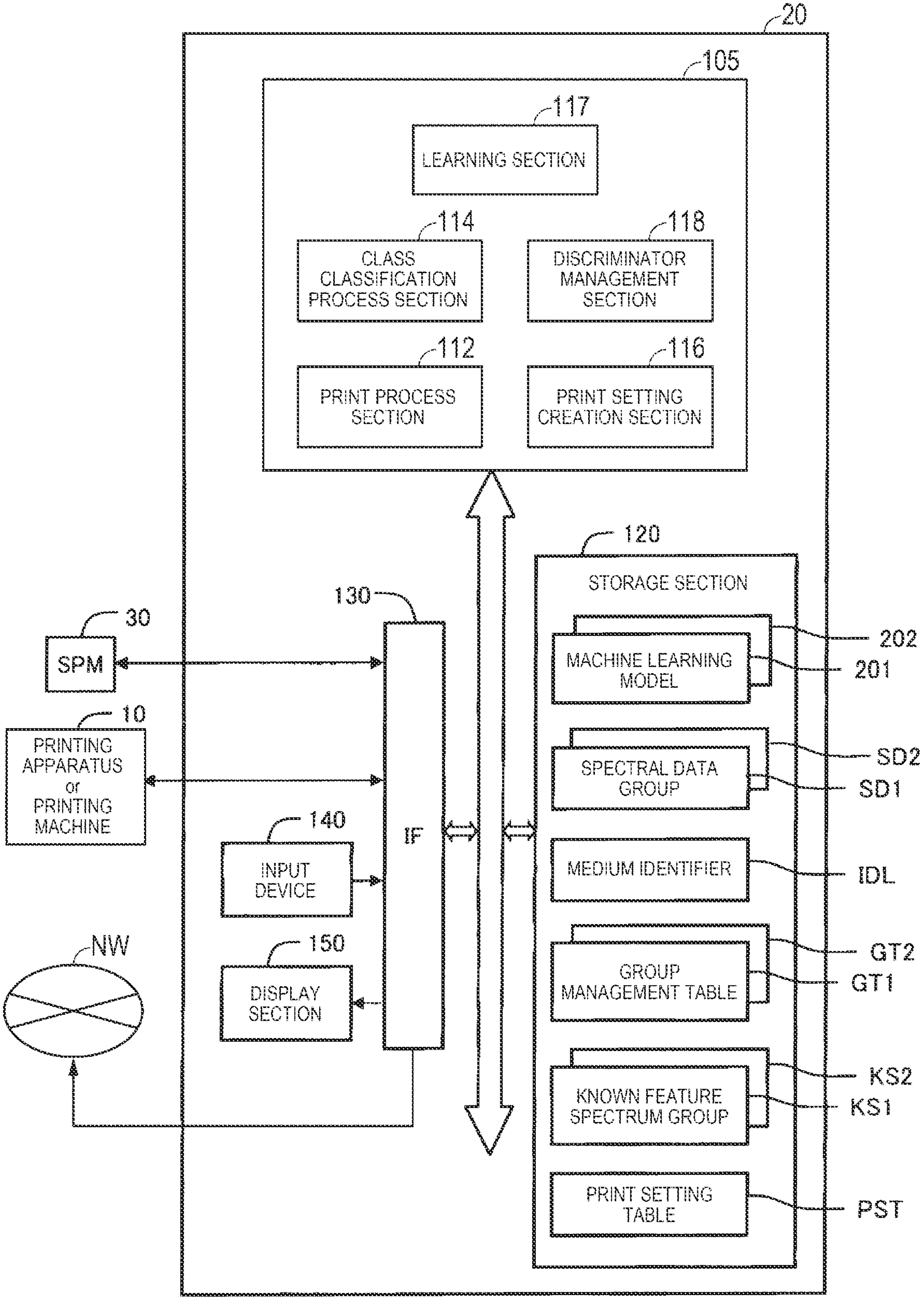
FIG. 3 is a block diagram of an information processing device.

FIG. 3 is a block diagram illustrating functions of the information processing device 20.

The information processing device 20 includes a processor 105, a storage section 120, an interface circuit 130, and an input device 140 and a display section 150 coupled to the interface circuit 130. The spectrometer 30 and the printer 10 are also coupled to the interface circuit 130. Further, the interface circuit 130 is coupled to a network NW by wire or wirelessly. The network NW is also coupled to a cloud environment.

Although not limited, for example, the processor 105 has not only a function of executing processes which will be described later in detail, and also a function of displaying, on the display section 150, data obtained through the processes and data generated during the processes.

The processor 105 functions as a print process section 112 that executes print processing using the printer 10, and also functions as a class classification process section 114 that executes a class classification process of the spectral data of the printing medium PM and as a print setting creation section 116 that creates print setting suitable for the printing medium PM. Furthermore, the processor 105 also functions as a learning section 117 that obtains a discriminator that has been machine-learned using physical information and type information of the printing medium PM, and as a discriminator management section 118 that manages information related to the discriminator. The discriminator will be described later.

The processor 105 executes computer programs stored in the storage section 120, thereby realizing the print process section 112, the class classification process section 114, the print setting creation section 116, the learning section 117, and the discriminator management section 118. In a preferred example, the processor 105 includes one or more processors. Each of the sections may be realized by a hardware circuit. The processor in the present embodiment is a term including such a hardware circuit.

Further, the processor executing the class classification process may be a processor that is included in a remote computer connected to the information processing device 20 via the network NW including the cloud environment.

In a preferred example, the storage section 120 includes a random access memory (RAM) and a read only memory (ROM). The storage section 120 may also include a hard disk drive (HDD).

The storage section 120 stores image data such as a printing parameter in accordance with physical information of the printing medium PM and type information, a graphical user interface (GUI) setting screen for inputting an operation of adding a new printing medium by a user, or the like, or a printing medium management program used in management such as addition of the printing medium. Examples of the printing parameter as a recording parameter include, for example, an ink ejection amount, a temperature of a heater for drying the ink, a drying time, a medium feeding speed, a transport parameter including media tension in the transport mechanism, and the like. Then, the printer 10 and the printing machine 11 perform printing based on the printing parameter. In addition, the storage section 120 also stores accuracy evaluation data of the discrimination accuracy of the discriminator. The accuracy evaluation data will be described later.

Furthermore, the storage section 120 stores a plurality of machine learning models 201 and 202, a plurality of spectral data groups SD1 and SD2, a medium identifier list IDL, a plurality of group management tables GT1 and GT2, and a plurality of known feature spectrum groups KS1 and KS2, and a print setting table PST. The machine learning models 201 and 202 are used in an operation by the class classification process section 114.

Configuration examples and operations of the machine learning models 201 and 202 will be described later. The spectral data groups SD1 and SD2 are a set of labeled spectral data used for learning of the machine learning models 201 and 202. The medium identifier list IDL is a list in which the medium identifier and the spectral data are registered for each printing medium. The plurality of group management tables GT1 and GT2 are tables showing management states of the spectral data groups SD1 and SD2. The known feature spectrum groups KS1 and KS2 are a set of feature spectra obtained when training data is input again to the learned machine learning models 201 and 202. The feature spectrum will be described later. The print setting table PST is a table in which print settings suitable for each printing medium are registered.

*Configuration of Machine Learning Model*

Figure 4:
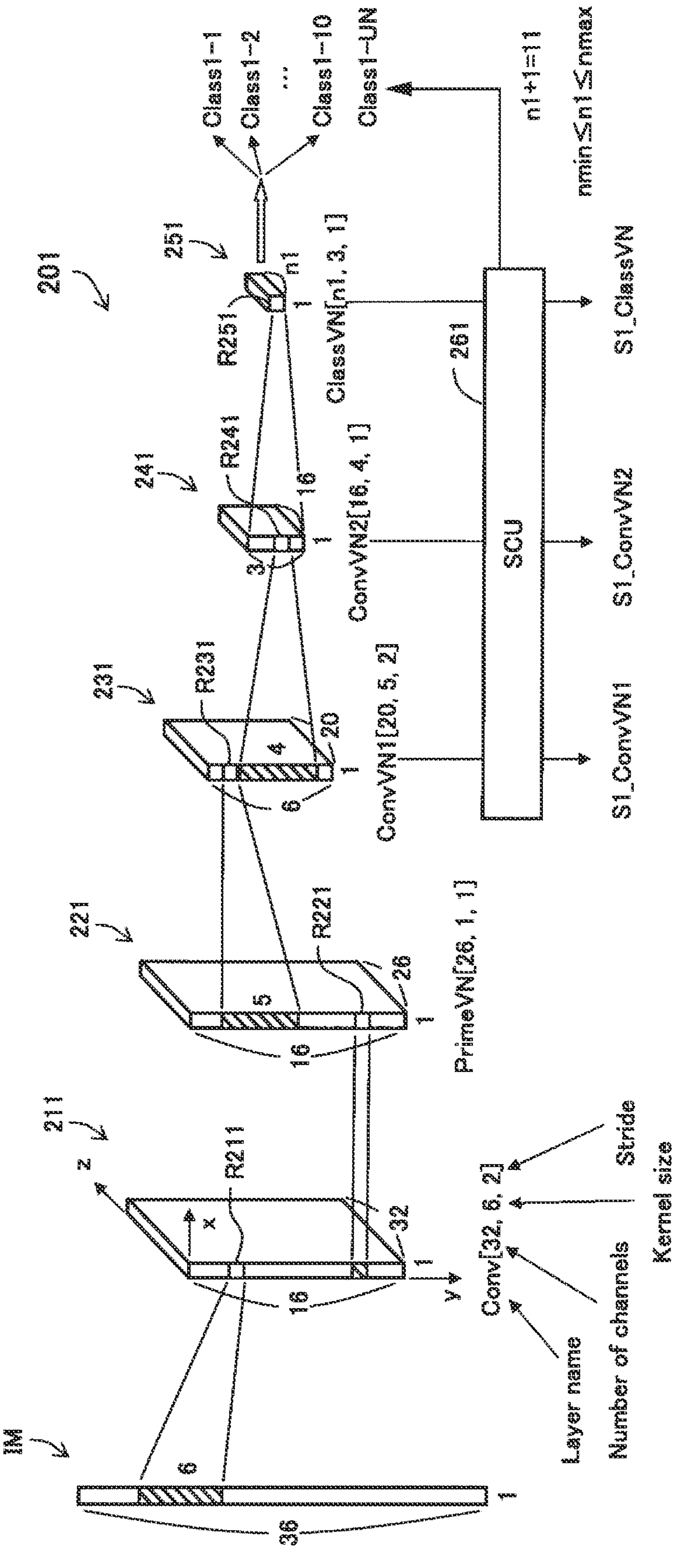
FIG. 4 is an explanatory diagram illustrating a configuration of a first machine learning model.

FIG. 4 is an explanatory diagram illustrating a configuration of a first machine learning model 201. The machine learning model 201 includes a convolution layer 211, a primary vector neuron layer 221, a first convolution vector neuron layer 231, a second convolution vector neuron layer 241, and a classification vector neuron layer 251 that are arranged in order from a side of input data IM. Among the five layers 211 to 251, the convolution layer 211 is the lowest layer, and the classification vector neuron layer 251 is the highest layer. In the following description, the layers 211 to 251 are also referred to as "Cony layer 211", "PrimeVN layer 221", "ConvVN1 layer 231", "ConvVN2 layer 241", and "ClassVN layer 251", respectively.

In the present embodiment, the input data IM is one-dimensional array data because it is the spectral data. For example, the input data IM is data obtained by extracting 36 representative values every 10 nm from the spectral data in the range of 380 nm to 730 nm.

In the example of FIG. 4, two convolution vector neuron layers 231 and 241 are used, but the number of convolution vector neuron layers is optional, and the convolution vector neuron layer may be omitted. However, it is preferable to use one or more convolution vector neuron layers.

The machine learning model 201 of FIG. 4 further has a similarity arithmetic section 261 that generates similarity. The similarity arithmetic section 261 can calculate similarity S1_ConvVN1, S1_ConvVN2, and S1_ClassVN, which will be described later, from outputs of the ConvVN1 layer 231, the ConvVN2 layer 241, and the ClassVN layer 251. However, the similarity arithmetic section 261 may be omitted.

The configuration of each layer 211 to 251 can be described as follows.

Description of Configuration of First Machine Learning Model 201

Conv layer 211: Conv [32, 6, 2]
PrimeVN layer 221: PrimeVN [26, 1, 1]
ConvVN1 layer 231: ConvVN1 [20, 5, 2]
ConvVN2 layer 241: ConvVN2 [16, 4, 1]
ClassVN layer 251: ClassVN [n1+1, 3, 1]
Vector dimension VD: VD=16

In the description of each of the layers 211 to 251, a character string before the parentheses is a layer name, and numbers in the parentheses are, in order, the number of channels, a kernel size, and a stride. For example, the layer name of the Conv layer 211 is "Conv", the number of channels is 32, the kernel size is 1×6, and the stride is 2. In FIG. 4, these descriptions are shown below each layer. The hatched rectangle drawn in each layer represents a kernel used to calculate an output vector of the adjacent higher layer. In the present embodiment, the kernel also has the one-dimensional array because the input data IM is one-dimensional array data. Values of the parameters used in the description of each layer 211 to 251 are examples and can be changed optionally.

The Conv layer 211 is a layer composed of scalar neurons. The other four layers 221 to 251 are layers composed of vector neurons. A vector neuron is a neuron that inputs and outputs a vector. In the above description, the dimension of the output vector of each vector neuron is constant at 16. In the following, the term "node" will be used as a superordinate concept of the scalar neurons and vector neurons.

In FIG. 4, the Conv layer 211 is illustrated using a first axis x and a second axis y that define plane coordinates of the node array and a third axis z that represents a depth. In addition, FIG. 4 illustrates that sizes in x, y, and z directions of the Conv layer 211 are 1, 16, and 32, respectively. The size in the x direction and the size in the y direction are called "resolution". In the present embodiment, the resolution in the x direction is always 1. The size in the z direction is the number of channels. The three axes x, y, and z are also used as coordinate axes indicating positions of each node in other layers. However, the axes x, y, and z are not illustrated in the layers other than the Conv layer 211 in FIG. 4.

As is well known, resolution W1 in the y direction after convolution is given by the following Equation.

$$W1=\mathrm{Ceil}\{(W0-Wk+1)/S\}$$

Here, W0 is resolution before convolution, Wk is a kernel size, S is a stride, and Ceil{X} is a function for an operation of rounding up X.

The resolution of each layer illustrated in FIG. 4 is an example when the resolution of the input data IM in the y direction is 36, and the actual resolution of each layer is appropriately changed according to the size of the input data IM.

The ClassVN layer 251 has n1 channels. The similarity arithmetic section 261 has one channel. In the example of FIG. 4, (n1+1)=11. Determination values Class1-1 to Class1-10 for a plurality of known classes are output from the channel of ClassVN layer 251, and determination values Class1-UN indicating that the unknown class are output from the channel of the similarity arithmetic section 261. The class having the largest value among the determination values Class1-1 to Class1-10 and Class1-UN corresponds to a class to which the input data IM belongs. Generally, n1 is an integer of 2 or more and is the number of known classes that can be classified using the first machine learning model 201. It is preferable in any one machine learning model that an upper limit value nmax and a lower limit value nmin for the number of known classes that can be classified are predetermined.

The determination value Class1-UN indicating that is the unknown class may be omitted. In this case, when the largest value among the determination values Class1-1 to Class1-10 for the known class is less than a predetermined threshold value, it is determined that the class of the input data IM is unknown.

Figure 5:
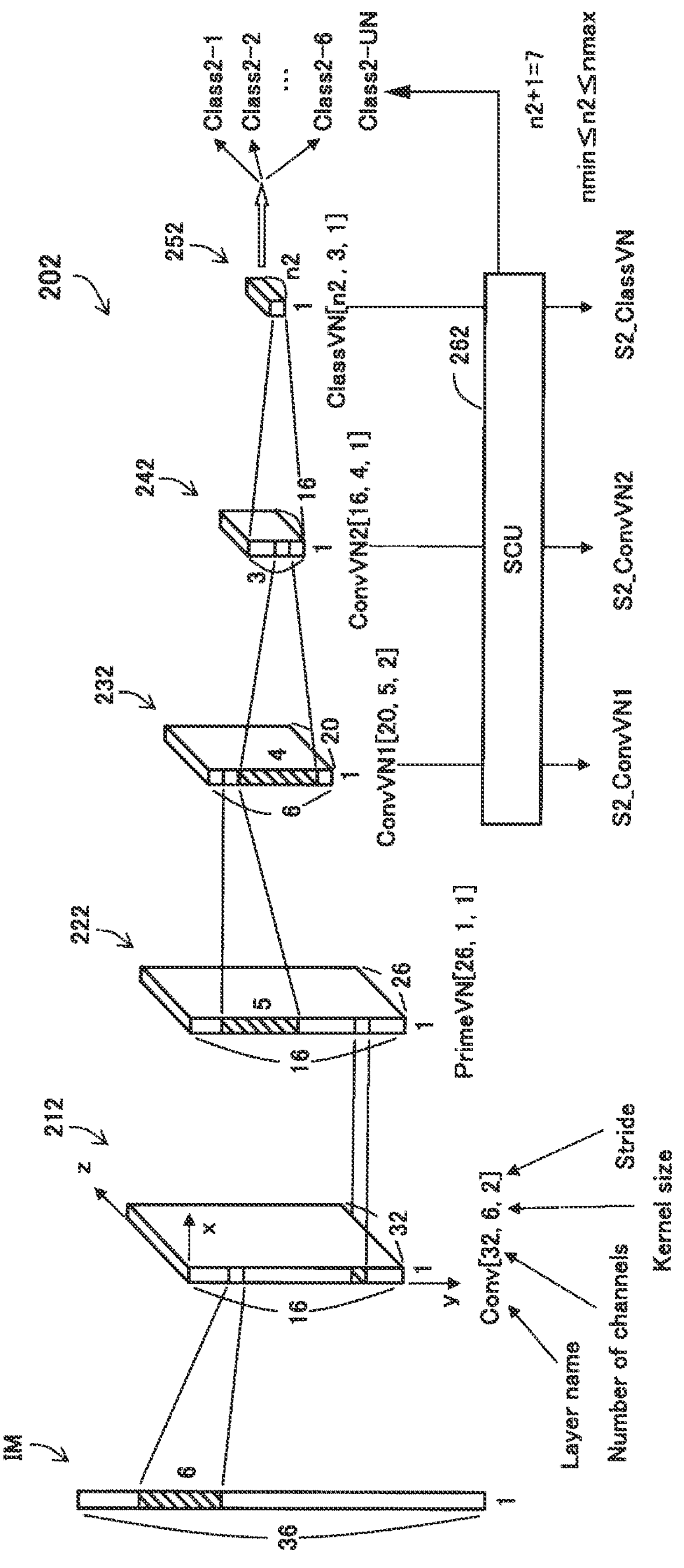
FIG. 5 is an explanatory diagram illustrating a configuration of a second machine learning model.

FIG. 5 is an explanatory diagram illustrating a configuration of the second machine learning model 202. Similar to the first machine learning model 201, the machine learning model 202 includes a Conv layer 212, a PrimeVN layer 222, a ConvVN1 layer 232, a ConvVN2 layer 242, a ClassVN layer 252, and a similarity arithmetic section 262.

The configuration of each layer 212 to 252 can be described as follows.

Description of Configuration of Second Machine Learning Model 202

Conv layer 212: Conv [32, 6, 2]

PrimeVN layer 222: PrimeVN [26, 1, 1]

ConvVN1 layer 232: ConvVN1 [20, 5, 2]

ConvVN2 layer 242: ConvVN2 [16, 4, 1]

ClassVN layer 252: ClassVN [n2+1, 3, 1]

Vector dimension VD: VD=16

As can be understood by comparing FIGS. 4 and 5, the lower four layers 212 to 242 among the layers 212 to 252 of the second machine learning model 202 have the same configurations as the layers 211 to 241 of the first machine learning model 201. On the other hand, a highest layer 252 of the second machine learning model 202 differs from the highest layer 251 of the first machine learning model 201 only in the number of channels. In the example of FIG. 5, the ClassVN layer 252 has n2 channels, and the similarity arithmetic section 262 has one channel, and (n2+1)=7. Determination values Class2-1 to Class2-6 for a plurality of known classes are output from the channel of ClassVN layer 252, and determination values Class2-UN indicating that the unknown class are output from the channel of the similarity arithmetic section 262. It is also preferable in the second machine learning model 202 that an upper limit value nmax and a lower limit value nmin, which are the same as those of the first machine learning model 201, for the number of known classes are set.

The second machine learning model 202 is configured to have at least one known class different from the first machine learning model 201. Further, since the class that can be classified is different between the first machine learning model 201 and the second machine learning model 202, the values of kernel elements are also different from each other. In the present disclosure, when N is an integer of 2 or more, any one of the N machine learning models is configured to have at least one known class different from the other machine learning models. In the present embodiment, the number N of machine learning models is set to 2 or more, but the present disclosure is also applicable to a case where only one machine learning model is used.

*Preparation Step for Machine Learning Model*

Figure 6:
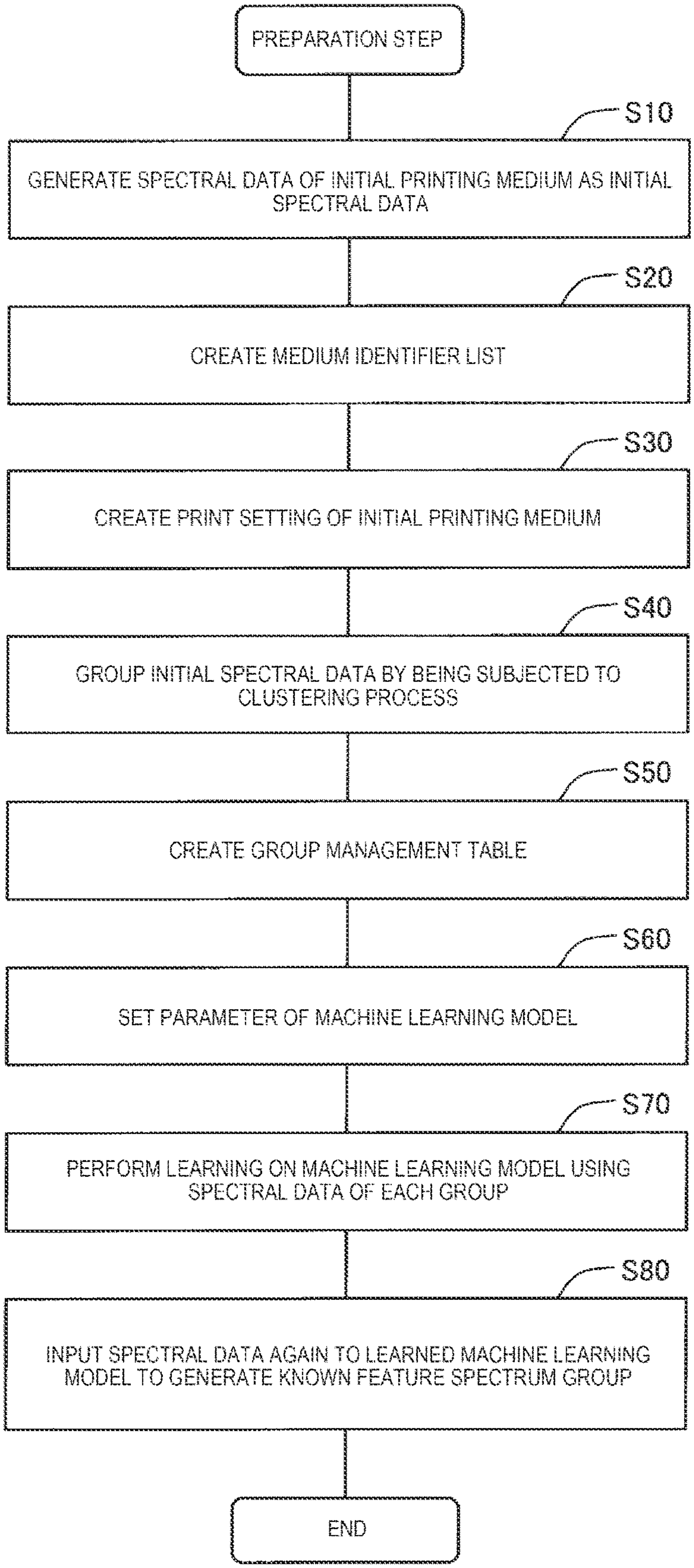
FIG. 6 is a flowchart illustrating a processing procedure of a preparation step.

FIG. 6 is a flowchart illustrating a processing procedure of the preparation step of the machine learning model. The preparation step is, for example, a process executed by a manufacturer of the printer 10.

In step S10, spectral data of a plurality of initial printing media is generated as initial spectral data. In the present embodiment, the initial printing media used for learning of the machine learning model in the preparation step are all any printing media. In the present disclosure, the term "any printing media" means a printing media that can be subjected to the class classification process by the machine learning model and can be excluded from being subjected to the class classification process without a user's exclusion instruction. On the other hand, the printing media added in medium addition process to be described later is an essential printing medium that cannot be excluded from being subjected to the class classification process without the user's exclusion instruction. However, a part or all of the initial printing media may be used as an essential printing medium.

In step S10, initial spectral data is generated by performing spectrometry on a plurality of initial printing media by the spectrometer 30 in an unprinted state. At this time, it is preferable to extend the data in consideration of variation in the spectral reflectance. Generally, the spectral reflectance varies depending on a color measurement date and a measuring instrument. The data extension is processing for generating a plurality of spectral data by imparting random variations to the measured spectral data in order to simulate such variations. It should be noted that the initial spectral data may be virtually generated without performing spectrometry on the actual printing medium. In this case, the initial printing medium is also virtual.

In step S20, a medium identifier list IDL is created for the plurality of initial printing media. FIG. is an explanatory diagram illustrating the medium identifier list IDL. A medium identifier, a medium name, a data sub-number, and spectral data assigned to each printing medium are registered in the medium identifier list IDL. In the example, medium identifiers “A-1” to “A-16” are assigned to 16 printing media. The medium name is a name of the printing medium displayed in a window for the user to set printing conditions. The data sub-number is a number for distinguishing the plurality of spectral data related to the same printing medium. In the example, three spectral data are registered for each printing medium. However, the number of spectral data for each printing medium may be different. For each printing medium, one or more spectral data may be registered, but a plurality of spectral data are preferably registered.

In step S30 of FIG. 6, print settings are created for each of the plurality of initial printing media and registered in the print setting table PST. FIG. 8 is an explanatory diagram illustrating the print setting table PST. In each record of the print setting table PST, a medium identifier and a print setting are registered for each printing medium. In the example, printer profiles PR1 to PR16, medium feeding speeds FS1 to FS16, and drying times DT1 to DT16 are registered as print settings. The medium feeding speeds FS1 to FS16 and the drying times DT1 to DT16 are a part of the printing parameters described above. The printer profiles PR1 to PR16 are color profiles for output of the printer 10, and are created for each printing medium. Specifically, a test chart is printed on a printing medium using the printer 10 without color correction, the test chart is spectroscopically measured by the spectrometer 30, and the print setting creation section 116 processes the spectrometry result, and thus it is possible to create a printer profile. The medium feeding speeds FS1 to FS16 and the drying times DT1 to DT16 can also be determined experimentally, respectively. The “drying time” is a time for drying the printing medium after printing in a dryer (not illustrated) in the printer 10. In a printer of the type in which the printing medium after printing is dried by blowing air, the “drying time” is an air blowing time. Further, in a printer without a dryer, the “drying time” is a waiting time for natural drying. Initial items other than the printer profile, the drying time, and the medium feeding speed may be set as the print settings, but it is preferable to create print settings including at least the printer profile.

Figure 9:
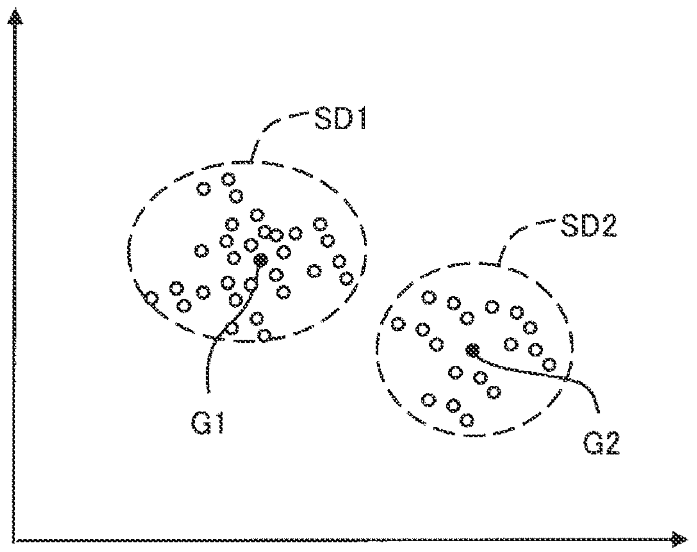
FIG. 9 is an explanatory diagram illustrating spectral data that has been subjected to clustering process.

In step S40 of FIG. 6, grouping is performed by executing the clustering process on a plurality of initial spectral data for the plurality of initial printing media. FIG. 9 is an explanatory diagram illustrating spectral data grouped by the clustering process. In the example, a plurality of spectral data are grouped into a first spectral data group SD1 and a second spectral data group SD2. As the clustering process, for example, k-means method can be used. The spectral data groups SD1 and SD2 have representative points G1 and G2 representing centers of the spectral data groups SD1 and SD2, respectively. The representative points G1 and G2 are, for example, a center of gravity. When the spectral data is composed of the reflectances at m wavelengths, one spectral data is regarded as data representing one point in the m-dimensional space, such that a distance between the spectral data and the centers of gravity of the plurality of spectral data can be calculated. In FIG. 9, for convenience of illustration, a plurality of spectral data points are drawn in the two-dimensional space, but in reality, the spectral data can be represented as points in the m-dimensional space. As will be described later, when a new printing medium is added as that being subjected to the class classification process, the representative points G1 and G2 are used when the spectral data of the additional printing medium is determined whether any one of the plurality of spectral data groups SD1 and SD2 is the closest. As the representative points G1 and G2, a point other than a center of gravity may be used. For example, spectral data composed of average values of a maximum value and a minimum value of the reflectances in each wavelength for the plurality of spectral data belonging to one group may be used as a representative point.

In the present embodiment, a plurality of spectral data are grouped into two spectral data groups SD1 and SD2, but only one spectral data group may be used or three or more spectral data groups may be created. Further, a plurality of spectral data groups may be created by a method other than the clustering process. However, when a plurality of spectral data are grouped by the clustering process, the spectral data close to each other can be grouped into the same group. When a plurality of machine learning models are learned using each of the plurality of spectral data groups, the accuracy of the class classification process by the machine learning model can be enhanced as compared with a case where the clustering process is not executed.

Even when spectral data of a new printing medium is added after being grouped by the clustering process, it is possible to maintain a state equivalent to a state where the spectral data of the new printing medium is grouped by the clustering process.

In step S50 of FIG. 6, group management tables GT1 and GT2 are created. FIG. 10 is an explanatory diagram illustrating the group management tables GT1 and GT2. For one spectral data, a group number, a medium identifier, a data sub-number, a distance from the representative point, a model number, a class label, an existing area, and coordinates of the representative point are registered in each record of the group management tables GT1 and GT2. The group number is a number for distinguishing the plurality of group management tables GT1 and GT2. The medium identifier and the data sub-number are used to distinguish each spectral data, similar to the medium identifier list IDL described with reference to FIG. 7. The model number is a number for identifying a machine learning model that is learned using the spectral data group of the group. Here, reference numerals “201” and “202” of the two machine learning models 201 and 202 illustrated in FIGS. 4 and 5 are used as model numbers. The “class label” is a value corresponding to a result of the class classification process by the machine learning model, and is also used as a label when the spectral data is used as training data. The model number and class label are set for each medium identifier. The “existing area” indicates whether the spectral data belongs to either a training area or a saving area. The “training area” means that the spectral data is actually used for performing learning on the machine learning model. The “saving area” means that the spectral data is not used for learning of the machine learning model and is saved from the training area. In the preparation step, all the spectral data belong to the training area because they are used for performing learning on the machine learning model.

In step S60 of FIG. 6, the user creates a machine learning model used for the class classification process and sets a parameter thereof. In the present embodiment, the two machine learning models 201 and 202 illustrated in FIGS. 4 and 5 are created to set parameters thereof. However, only one machine learning model may be created or three or more machine learning models may be created in step S60. In step S70, the class classification process section 114 performs learning on the machine learning models 201 and 202 using the spectral data groups SD1 and SD2. When the learning is completed, the learned machine learning models 201 and 202 are stored in the storage section 120.

In step S80, the class classification process section 114 inputs the spectral data groups SD1 and SD2 again to the learned machine learning models 201 and 202 to generate known feature spectrum groups KS1 and KS2. The known feature spectrum groups KS1 and KS2 are a set of feature spectra to be described later. Hereinafter, a method for generating the known feature spectrum group KS1 mainly associated with the machine learning model 201 will be described.

Figures 11, 12:
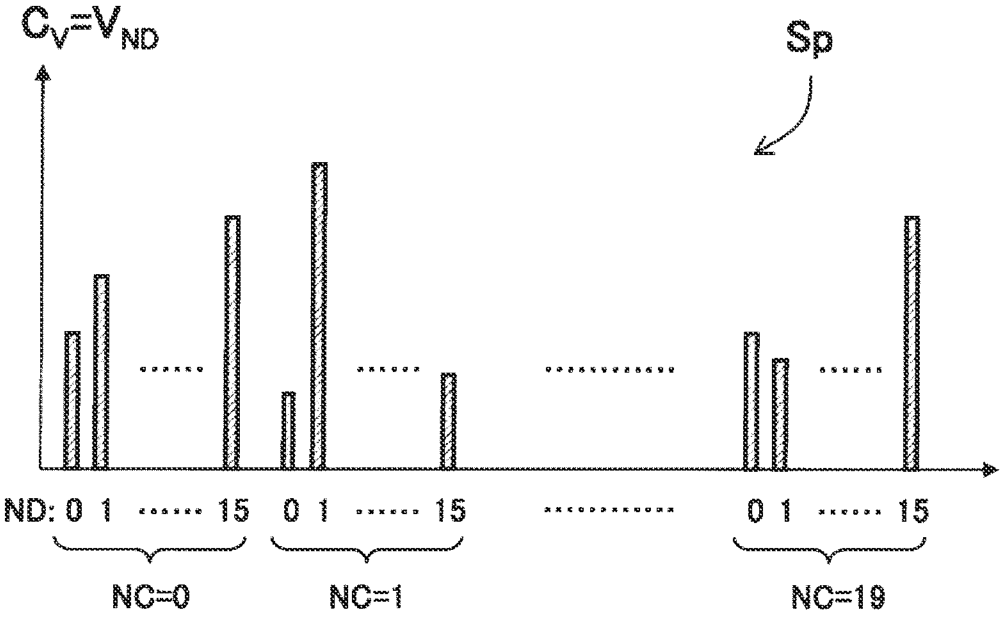
FIG. 11 is an explanatory diagram illustrating a feature spectrum.
FIG. 12 is an explanatory diagram illustrating a configuration of a known feature spectrum group.

FIG. 11 is an explanatory diagram illustrating a feature spectrum Sp obtained by inputting any input data to the learned machine learning model 201. Here, the feature spectrum Sp obtained from the output of the ConvVN1 layer 231 will be described. A horizontal axis of FIG. 11 is a spectral position represented by a combination of an element number ND of the output vector of the node at one plane position (x, y) of the ConvVN1 layer 231 and the channel number NC. In the present embodiment, the element number ND of the output vector is 16, from 0 to 15, because the vector dimension of the node is 16. In addition, the channel number NC is 20, from 0 to 19, because the number of channels of the ConvVN1 layer 231 is 20.

A vertical axis of FIG. 11 indicates a feature value CV at each spectral position. In the example, the feature value CV is a value VND of each element of the output vector. As the feature value CV, a value obtained by multiplying the value VND of each element of the output vector by an activation value to be described later may be used, or the activation value may be used as it is. In the latter case, the number of feature value CVs included in the feature spectrum Sp is equal to the number of channels, which is 20. The activation value is a value corresponding to a vector length of the output vector of the node.

Since the number of feature spectra Sp obtained from the output of ConvVN1 layer 231 for one input data is equal to the number of plane positions (x, y) of ConvVN1 layer 231, 1×6=6.

Similarly, for one input data, three feature spectra Sp are obtained from the output of ConvVN2 layer 241, and one feature spectrum Sp is obtained from the output of ClassVN layer 251.

When the training data is input again to the learned machine learning model 201, the similarity arithmetic section 261 calculates the feature spectrum Sp illustrated in FIG. 11 and registers the feature spectrum Sp in the known feature spectrum group KS1.

FIG. 12 is an explanatory diagram illustrating a configuration of the known feature spectrum group KS1. In the example, the known feature spectrum group KS1 includes a known feature spectrum group KS1_ConvVN1 obtained from the output of the ConvVN1 layer 231, a known feature spectrum group KS1_ConvVN2 obtained from the output of the ConvVN2 layer 241, and a known feature spectrum group KS1_ConvVN1 obtained from the output of the ClassVN layer 251.

Each record of the known feature spectrum group KS1_ConvVN1 includes a record number, a layer name, a label Lb, and a known feature spectrum KSp. The known feature spectrum KSp is the same as the feature spectrum Sp in FIG. 11 obtained in response to the input of training data. In the example of FIG. 12, the spectral data group SD1 is input to the learned machine learning model 201, such that the known feature spectrum KSp associated with a value of each label Lb is generated from the output of the ConvVN1 layer 231 and registered. For example, N1_1max known feature spectra KSp associated with label Lb=1 are registered, N1_2max known feature spectra KSp associated with label Lb=2 are registered, and N1_n1max known feature spectra KSp associated with label Lb=n1 are registered. N1_1max, N1_2max, and N1_n1max are integers of 2 or more, respectively. As described above, individual labels Lb correspond to known classes that differ from each other. Therefore, it can be understood that each known feature spectrum KSp in the known feature spectrum group KS1_ConvVN1 is associated with and registered in one of a plurality of known classes. The same applies to the other known feature spectrum groups KS1_ConvVN2 and KS1_ConvVN1.

The spectral data group used in step S80 does not have to be the same as the plurality of spectral data groups SD1 and SD2 used in step S70. However, there is an advantage in that it is not necessary to prepare new training data as long as a part or all of the plurality of spectral data groups SD1 and SD2 used in step S70 are also used in step S80. Step S80 may be omitted.

*Medium Discrimination/Printing Step by Machine Learning Model*

Figure 13:
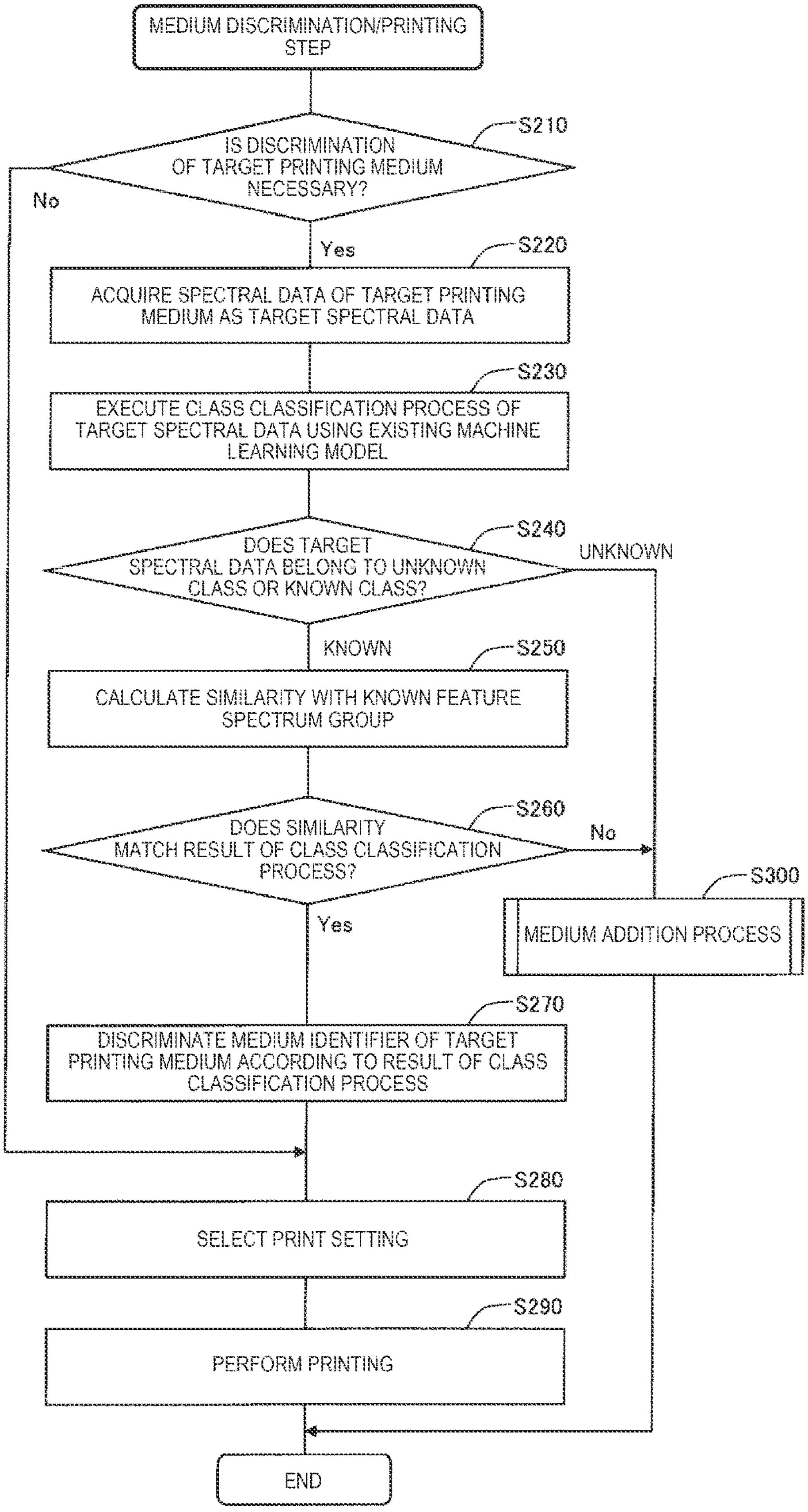
FIG. 13 is a flowchart illustrating a processing procedure of a medium discrimination/printing step.

FIG. 13 is a flowchart illustrating a processing procedure of a medium discrimination/printing step using the learned machine learning model. The medium discrimination/printing step is executed by, for example, a user who uses the printer 10.

In step S210, it is determined whether or not a discrimination process is necessary for a target printing medium which is a printing medium as an object to be processed. When the discrimination process is unnecessary, that is, when a type of the target printing medium is known, the process proceeds to step S280 to select a print setting suitable for the target printing medium, and printing is performed using the target printing medium in step S290. On the other hand, when the type of the target printing medium is unclear and the discrimination process is required, the process proceeds to step S220.

In step S220, the class classification process section 114 acquires target spectral data by causing the spectrometer 30 to perform spectrometry on the target printing medium. The target spectral data is subjected to class classification process by a machine learning model.

In step S230, the class classification process section 114 inputs the target spectral data to the existing learned machine learning models 201 and 202, and executes the class classification process of the target spectral data. In this case, either a first process method in which the plurality of machine learning models 201 and 202 are sequentially used one by one or a second process method in which the plurality of machine learning models 201 and 202 are used simultaneously can be used. In the first process method, the class classification process is executed first using one machine learning model 201, and when it is determined that the target spectral data belongs to an unknown class as a result, the class classification process is executed using another machine learning model 202. In the second process method, two machine learning models 201 and 202 are used simultaneously to execute the class classification process on the same target spectral data in parallel, and the class classification process section 114 integrates the processing results. According to an experiment of the inventors of the present disclosure, the second process method is more preferable because a processing time is shorter than that of the first process method.

In step S240, the class classification process section 114 determines whether the target spectral data belongs to an unknown class or a known class from the result of the class classification process in step S230. When the target spectral data belongs to the unknown class, the target printing medium is a new printing medium that does not correspond to any one of the plurality of initial printing media used in the preparation step and the printing medium added in a medium addition process to be described later. Therefore, the process proceeds to step S300 to be described later, and the medium addition process is executed. On the other hand, when the target spectral data belongs to a known class, the process proceeds to step S250.

In step S250, a similarity to the known feature spectrum group is calculated using one of the plurality of machine learning models 201 and 202 that has been determined that the target spectral data belongs to the known class. For example, when it is determined by the processing of the first machine learning model 201 that the target spectral data belongs to the known class, the similarity arithmetic section 261 calculates similarities S1_ConvVN1, S1_ConvVN2, and S1_CLssVN to the known feature spectrum group KS1 from the outputs of the ConvVN1 layer 231, the ConvVN2 layer 241, and the ClassVN layer 251, respectively. On the other hand, when it is determined by the processing of the second machine learning model 202 that the target spectral data belongs to the known class, the similarity arithmetic section 262 calculates similarities S2 ConvVN1, S2 ConvVN2, and S2_CLssVN to the known feature spectrum group KS2.

Hereinafter, a method for calculating the similarity S1_ConvVN1 from the output of the ConvVN1 layer 231 of the first machine learning model 201 will be described.

The similarity S1_ConvVN1 can be calculated using, for example, the following Equation:

$$S1\_ConvVN1(\mathrm{Class})=\max[G\{Sp(i,j),KSp(\mathrm{Class},k)\}]$$

wherein "Class" indicates an ordinal number for a plurality of classes, G{a,b} indicates a function for obtaining a similarity between a and b, and Sp(i,j) indicates feature spectra at all plane positions (i,j) obtained according to the target spectral data, KSp(Class,k) indicates all the known feature spectra associated with the ConvVN1 layer 231 and the specific "Class", and max[X] indicates a logical operation that takes the maximum value of X. That is, the similarity S1_ConvVN1 is the maximum value of the similarity calculated between each of the feature spectra Sp (i,j) at all the plane positions (i,j) of the ConvVN1 layer 231 and each of all the known feature spectra KSp(k) corresponding to the specific class, respectively. Such a similarity S1_ConvVN1 is obtained for each of the plurality of classes corresponding to a plurality of labels Lb. The similarity S1_ConvVN1 represents a degree to which the target spectral data is similar to a feature of each class.

The similarities S1_ConvVN2 and S1_ClassVN related to the outputs of ConvVN2 layer 241 and ClassVN layer 251 are also generated in the same manner as the similarity S1_ConvVN1. It is not necessary to generate all of three similarities S1_ConvVN1, S1_ConvVN2, and S1_ClassVN, but it is preferable to generate one or more the similarities S1_ConvVN1, S1_ConvVN2, and S1_ClassVN. In the present disclosure, a layer used to generate the similarity is also referred to as a "specific layer".

In step S260, the class classification process section 114 presents the similarity obtained in step S250 to the user, and the user confirms whether or not the similarity matches the result of the class classification process. The similarity S1_ConvVN1, S1_ConvVN2, and S1_ClassVN represent the degree to which the target spectral data is similar to the feature of each class, and thus it is possible to confirm the result of the class classification process that is good or bad from at least one of the similarities S1_ConvVN1, S1_ConvVN2, and S1_ClassVN. For example, when at least one of the three similarities S1_ConvVN1, S1_ConvVN2, and S1_ClassVN does not match the result of the class classification process, it can be determined that the similarities do not match the result of the class classification process. In another embodiment, when all the three similarities S1_ConvVN1, S1_ConvVN2, and S1_ClassVN do not match the result of the class classification process, it may be determined that the similarities do not match the result of the class classification process. Generally, when a predetermined number of similarities among a plurality of similarities generated from the outputs of a plurality of specific layers do not match the result of the class classification process, it is determined that the predetermined number of similarities do not match the result of the class classification process. The determination in step S260 may be performed by the class classification process section 114. Further, step S250 and step S260 may be omitted.

When the similarity matches the result of the class classification process, the process proceeds to step S270, and the class classification process section 114 discriminates the medium identifier of the target printing medium according to the result of the class classification process. For example, the process is executed by referring to the group management tables GT1 and GT2 illustrated in FIG. 10. In step S280, the print process section 112 selects a print setting according to the medium identifier. The process is executed by referring to the print setting table PST illustrated in FIG. 8. In step S290, the print process section 112 performs printing according to the print setting.

When it is determined in step S260 that the similarity does not match the result of the class classification process, the target printing medium is a new printing medium that does not correspond to any one of the plurality of initial printing media used in the preparation step and the printing medium added in a medium addition process to be described later. Therefore, the process proceeds to step S300 to be described later. In step S300, the medium addition process is executed in order to make the new printing medium an object being subjected to the class classification process. Since the machine learning model is updated or added in the medium addition process, the medium addition process can be considered as a part of the step of preparing the machine learning model.

*Printing Medium Addition Process*

Figure 14:
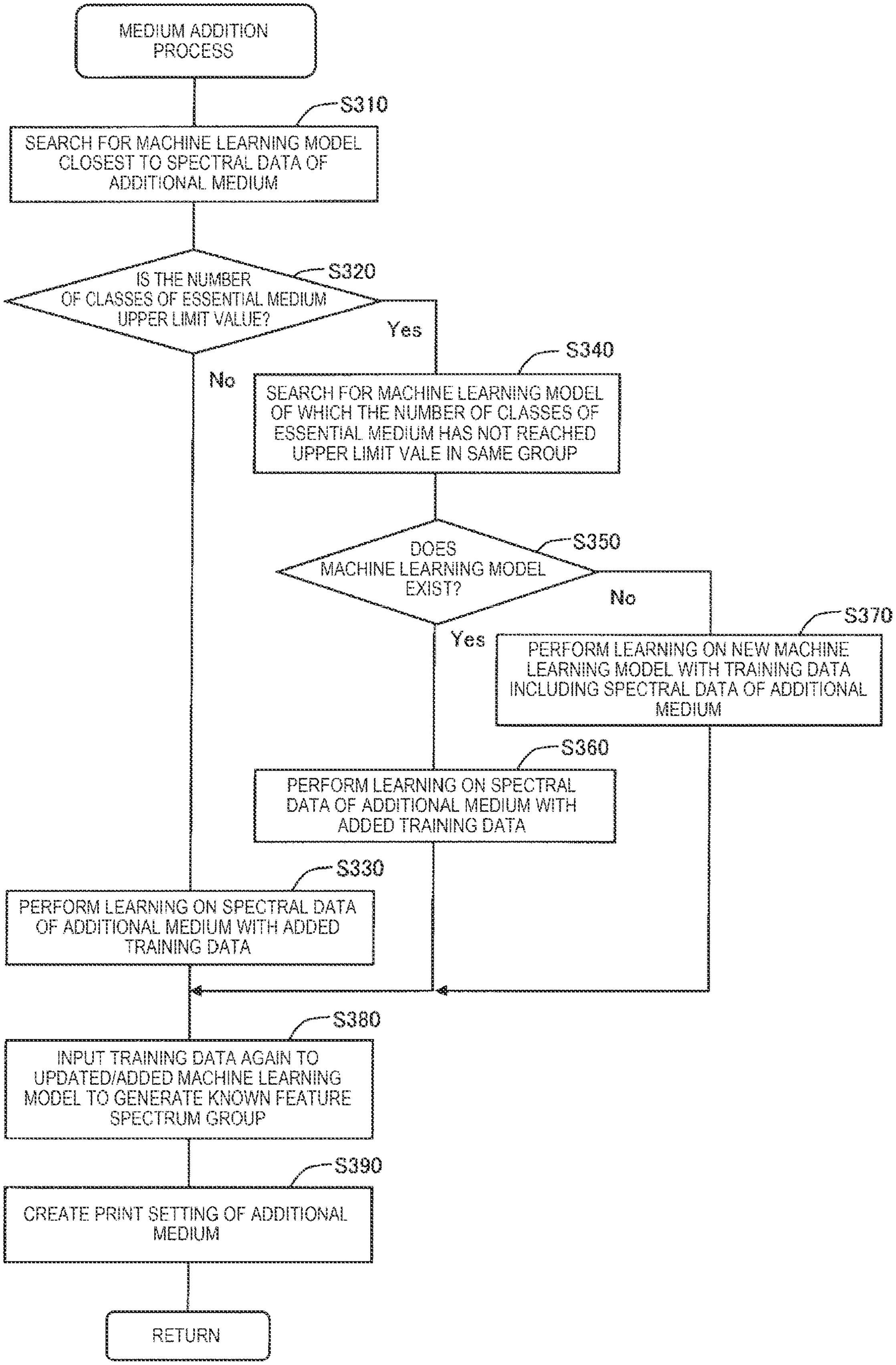
FIG. 14 is a flowchart illustrating a processing procedure of a medium addition process.
Figure 15:
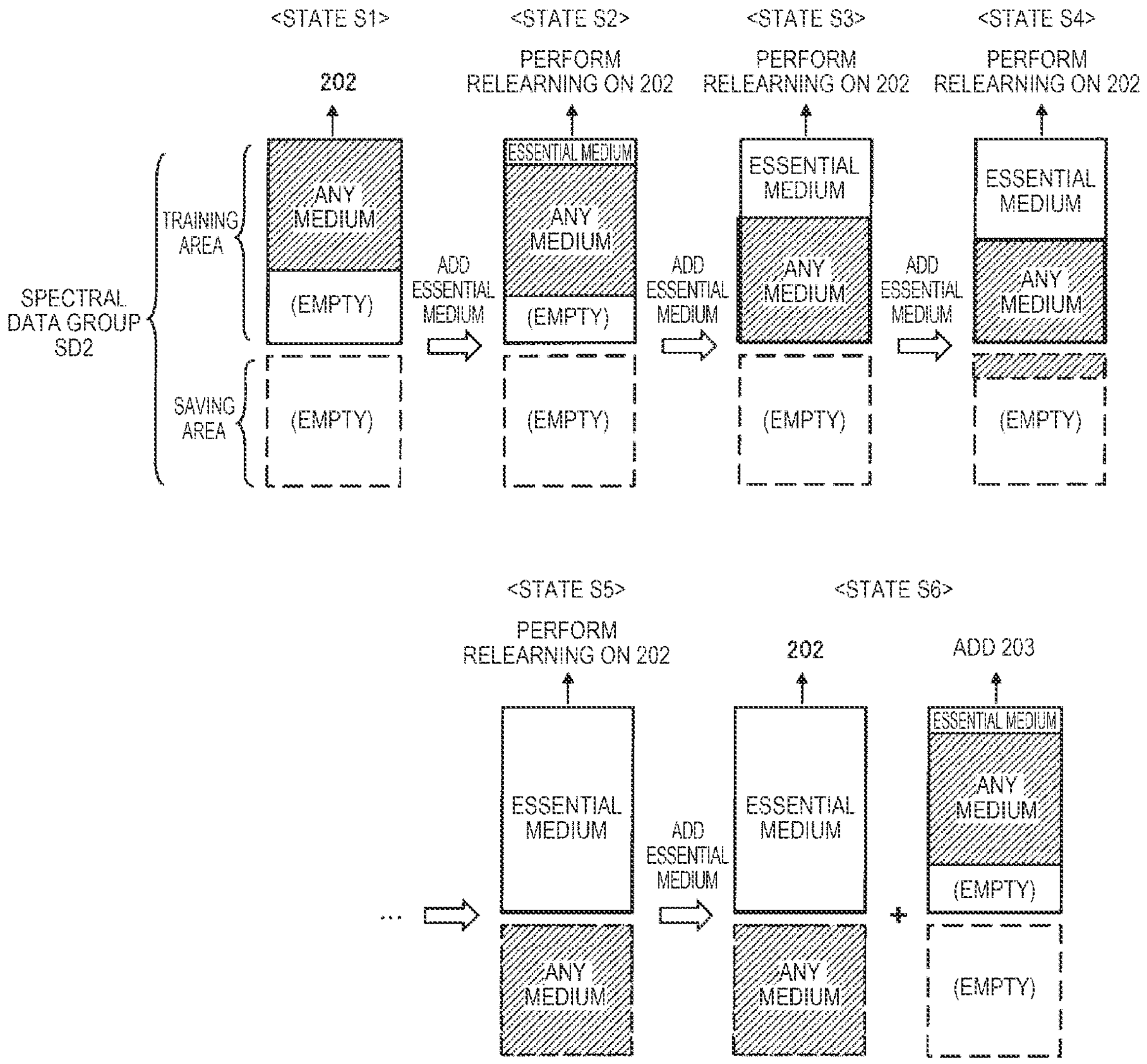
FIG. 15 is an explanatory diagram illustrating a management state of a spectral data group.

FIG. 14 is a flowchart illustrating a processing procedure of the medium addition process, and FIG. 15 is an explanatory diagram illustrating a management state of the spectral data group in the medium addition process. In the following description, a new printing medium added as an object being subjected to the class classification process is referred to as an "additional printing medium" or an "additional medium".

In step S310, the class classification process section 114 searches for the machine learning model closest to the spectral data of the additional printing medium from the existing machine learning models 201 and 202. The "machine learning model closest to the spectral data of the additional printing medium" means a machine learning model that has the shortest distance between the representative points Gland G2 of a training data group used for learning of each machine learning models 201 and 202 and the spectral data of the additional printing medium. The distance between each of the representative points G1 and G2 and the spectral data of the additional printing medium can be calculated as, for example, the Euclidean distance. The training data group having the smallest distance from the spectral data of the additional printing medium is also referred to as a "proximity training data group".

In step S320, the class classification process section 114 determines whether or not the number of classes corresponding to the essential printing medium has reached an upper limit value for the machine learning model searched in step S310. As described above, in the present embodiment, all the initial printing media used in the preparation step are any printing media, and all the printing media added after the preparation step are essential printing media. When the number of classes corresponding to the essential printing medium has not reached the upper limit value, the process proceeds to step S330, and learning of the machine learning model is performed with the training data to which the spectral data of the additional printing medium is added. State S1 of FIG. 15 indicates a state of the spectral data group SD2 used for learning of the machine learning model 202 in the above-described preparation step, and state S2 indicates a state in which the spectral data of the additional printing medium is added as spectral data of the essential printing medium in the step S330. In FIG. 15, "any medium" means spectral data of the any printing medium used in the preparation step, and an "essential medium" means spectral data of the essential printing medium added by the medium addition process of FIG. 14. The "training area" means training data that is actually used for performing learning on the machine learning model by the spectral data. The "saving area" means that the spectral data is not used for learning of the machine learning model and is saved from the training area. In addition, a state in which there is an empty space in the training area means that the number of classes of the machine learning model 202 has not reached the upper limit value. Since the number of classes in the machine learning model 202 corresponding to the essential printing medium has not reached the upper limit value in the state S1, the spectral data of the additional printing medium is added to the training area and becomes the state S2, and relearning of the machine learning model 202 is performed using the spectral data belonging to the training area as training data. Only the added spectral data may be used as the training data in the relearning.

FIG. 16 illustrates the medium identifier list IDL in the state S2 of FIG. 15, and FIG. 17 illustrates the group management table GT2 for the second spectral data group SD2 in the state S2. "B-1" is assigned as the medium identifier of the added printing medium, and the medium name and the spectral data are registered in the medium identifier list IDL. As for the spectral data of the additional printing medium, it is preferable that a plurality of spectral data are generated by performing data extension that imparts random variation to the measured spectral data. A plurality of spectral data for the added printing medium having the medium identifier B-1 are also registered in the group management table GT2. The representative point G2 for the training data group in the second spectral data group SD2 is recalculated by including the added spectral data.

When a printing medium is further added from the state S2 of FIG. 15, the state transitions to state S3, state S4, and state S5. Since the number of classes in the machine learning model 202 corresponding to the essential printing medium has not reached the upper limit value in the state S2 to the state S4, similarly to the state S1, the step S330 is executed, the spectral data of the additional printing medium is added to the training area, and relearning of the machine learning model 202 is performed. In the state S3, the sum of the number of classes corresponding to the essential printing medium and the number of classes corresponding to the any printing medium in the machine learning model 202 has reached the upper limit value, and there is no empty space in the training area. Therefore, when the state transitions from the state S3 to the state S4, in step S330, the spectral data of the additional printing medium, which is an essential printing medium, is added to the training area, and the spectral data of the any printing medium is deleted from the training area. The deleted spectral data is saved in the saving area. The reason for saving the spectral data in the saving area is to make it possible to reuse the spectral data. It is preferable to select the spectral data of the any printing medium that is saved from the training area to the saving area, which has the longest distance from the representative point of the training data group. By doing so, the distance between the training data can be reduced, and the accuracy of the class classification process can be enhanced.

In the state S5 of FIG. 15, the number of classes in the machine learning model 202 corresponding to the essential printing medium has reached the upper limit value. In this case, the process proceeds from step S320 to step S340. In step S340, the class classification process section 114 searches for a machine learning model which belongs to the same group as the machine learning model searched in step S310 and in which the number of classes corresponding to the essential printing medium has not reached an upper limit value for the machine learning model searched. When such a machine learning model exists, the process proceeds from step S350 to step S360, and learning of the machine learning model is performed with the training data to which the spectral data of the additional printing medium is added. The process is the same as that of step S330 described above.

When the machine learning model is not found by the search in step S340, the process proceeds from step S350 to step S370 to create a new machine learning model, and learning of the new machine learning model is performed with training data including the spectral data of the additional printing medium. This process corresponds to a process of changing from the state S5 to the state S6 in FIG. 15. In the state S5, the number of classes in the machine learning model 202 corresponding to the essential printing media has reached the upper limit value, and no other machine learning models belonging to the same group exists. Therefore, a new machine learning model 203 is created by the process of step S370 as shown in the state S6, and learning of the new machine learning model is performed with training data including the spectral data of the additional printing medium which is a new essential printing medium. At this time, since the spectral data of the additional printing medium alone is not sufficient as the training data, the spectral data of one or more any printing media saved in the saving area is also used as the training data. By doing so, it is possible to enhance the accuracy of the class classification process by the new machine learning model 203.

The above-described steps S340 to S360 may be omitted, and when the number of classes of the essential printing media in step S320 is equal to the upper limit value, the process immediately proceeds to step S370.

FIG. 18 illustrates the group management table GT2 for the second group in the state S6. The spectral data of the printing medium having medium identifiers A-1 to A-6 is the spectral data of the any printing medium used in the preparation step. Further, the spectral data of the printing medium having medium identifiers B-1 to B-11 is the spectral data of the Essential printing medium added after the preparation step. States of spectral data for two machine learning models 202 and 203 belonging to the same group are registered in the group management table GT2. For the machine learning model 202, the spectral data about added 10 essential printing media is contained in the training area, and the spectral data about six any printing media is saved in the saving area. For the machine learning model 203, the spectral data about one essential printing medium and the spectral data about six any printing media are contained in the training area, and the saving area is empty. Representative points G2*a* and G2*b* of the training data groups of the machine learning models 202 and 203 are calculated using the spectral data contained in the respective training areas.

The medium addition process illustrated in FIG. can be executed when the number of existing machine learning models is one. When the number of existing machine learning models is one, for example, the second machine learning model 202 illustrated in FIG. 5 is not prepared, and the process of FIG. 13 may be executed using only the first machine learning model 201 illustrated in FIG. 4. In this case, the process of step S370 in FIG. 14 is a process of adding the second machine learning model 202 as a new machine learning model. As such, in the class classification process performed using only the first machine learning model 201, it is possible to understand the processing of adding the second machine learning model 202 as a new machine learning model when it is determined that the input data belongs to an unknown class, as an example of a process of preparing two machine learning models 201 and 202.

When the machine learning model is updated or added in one of steps S330, S360, and S370, in step S380, the class classification process section 114 inputs the training data again to the updated or added machine learning model to generate a known feature spectrum group. Since the process is the same as that in step S230 of FIG. 13, the description thereof will be omitted. In step S390, the print setting creation section 116 creates the print setting of the added target printing medium. Since the process is the same as that in step S30 of FIG. 6, the description thereof will be omitted.

When the process of FIG. 14 is completed in this way, the process of FIG. 13 is also completed. Thereafter, the process of FIG. 13 is executed again at an any timing.

In the process of FIG. 14 described above, the process of step S310 is a process of selecting a proximity training data group that has a representative point closest to the spectral data of the additional printing medium among N training data groups used for learning of N machine learning models, and selecting a specific machine learning model that has been learned using the proximity training data group. By executing such a process, even when the spectral data of the additional printing medium is added to the proximity training data group, the added training data group can be maintained in a state equivalent to a state in which the spectral data is grouped by the clustering process. As a result, the accuracy of the class classification process by the machine learning model can be enhanced.

According to the process of FIG. 14, a new printing medium can be added to an object to be subjected to the class classification process. On the other hand, it is also possible to exclude the printing medium from an object to be subjected to the class classification process in response to a user's instruction.

Figure 19:
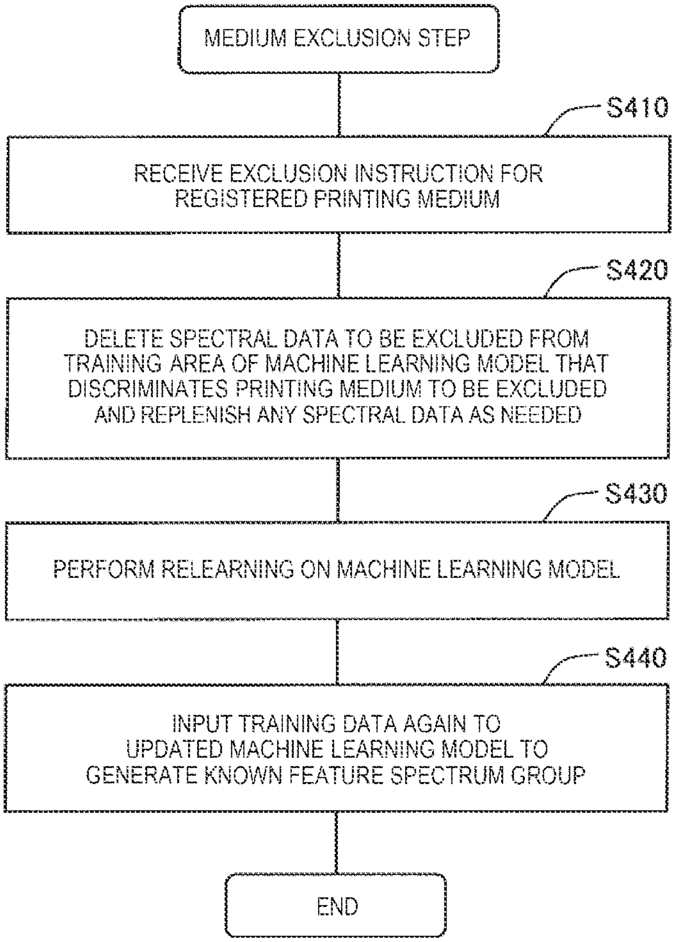
FIG. 19 is a flowchart illustrating a processing procedure of a medium exclusion step.

FIG. 19 is a flowchart illustrating a processing procedure of a medium exclusion step of excluding a printing medium from the object to be subjected to the class classification process. In step S410, the class classification process section 114 receives an exclusion instruction for the registered printing medium from the user. In step S420, the spectral data of the printing medium to be excluded is deleted from the training area of the machine learning model that discriminates the printing medium to be excluded, and the spectral data of the any printing medium is replenished in the training area if necessary. The expression "if necessary" means, for example, a case where the number of classes of the machine learning model becomes less than a lower limit value. For example, when the exclusion instruction of the essential printing medium is received from the state S5 of FIG. 15, the spectral data of the essential printing medium is deleted from the training area of the machine learning model 202. When a plurality of essential printing media are excluded, the number of classes in the machine learning model 202 is less than the lower limit value. In this case, the spectral data as the training data is replenished by moving the spectral data of the any printing medium from the saving area to the training area. As a result, an any printing medium corresponding to the replenished spectral data is added as a class of the machine learning model 202. By doing so, it is possible to prevent the accuracy of the class classification process from being excessively lowered due to the number of classes of the machine learning model 202 being less than the lower limit value. It is preferable to select the spectral data of the any printing medium that is replenished from the saving area to the training area, which has the shortest distance from the representative point of the training data group. By doing so, the distance between the training data can be reduced, and the accuracy of the class classification process can be enhanced. The medium identifier list IDL, the print setting table PST, and the group management tables GT1 and GT2 are appropriately updated according to the deletion or movement of such spectral data.

In step S430, the class classification process section 114 performs relearning on the machine learning model using the training data updated in step S420. In step S440, the class classification process section 114 inputs the training data again to the relearned machine learning model to generate a known feature spectrum group. Since the process is the same as that in step S230 of FIG. 13, the description thereof will be omitted. By executing the medium exclusion step as described above, the essential printing medium can be excluded from the object to be subjected to the class classification process of the machine learning model.

As described above, since when N is an integer of or more, the class classification process is executed using N machine learning models in the present embodiment, a printing medium having similar optical characteristics can be accurately discriminated. Furthermore, by executing the class classification process using two or more machine learning models, the process can be executed at a higher speed than a case where one machine learning model is subjected to class classification process into a plurality of classes.

*Update Process of Machine Learning Model*

Figure 20:
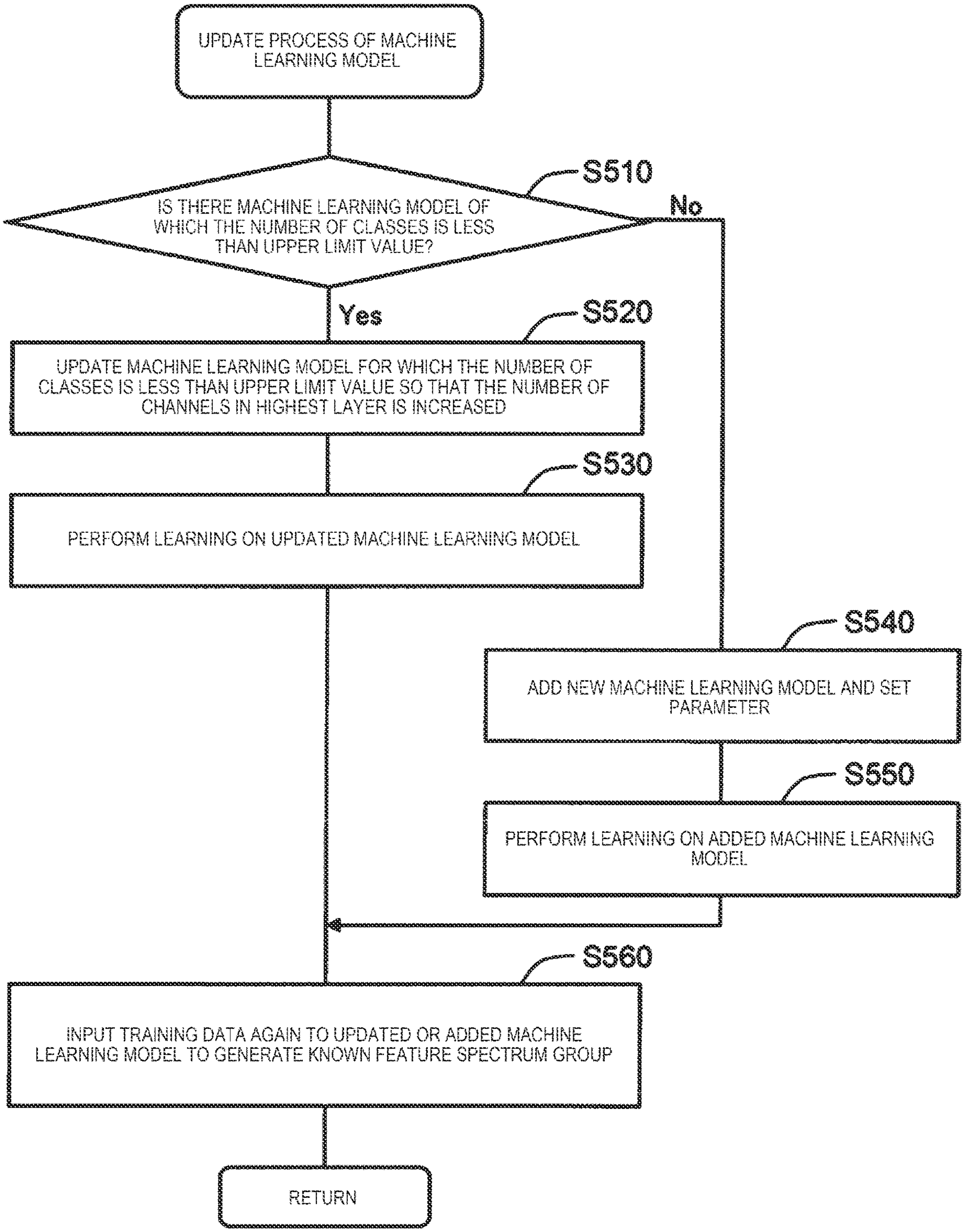
FIG. 20 is a flowchart illustrating a processing procedure of update process of the machine learning model.

FIG. 20 is a flowchart illustrating a processing procedure of update process of the machine learning model.

In step S510, it is determined whether or not there is a machine learning model of which the number of classes is less than the upper limit value among the existing machine learning models. When N is an integer of 2 or more, and when there are N existing machine learning models, it is determined whether or not there is a machine learning model of which the number of classes is less than the upper limit value. However, the number of the existing machine learning models N may be 1. In the present embodiment, there are two existing machine learning models 201 and 202 illustrated in FIGS. 4 and 5, and the first machine learning model 201 has the number of classes equal to the upper limit value, and the second machine learning model 202 has the number of classes less than the upper limit value. When there is no machine learning model of which the number of classes is less than the upper limit value among the existing machine learning models, the process proceeds to step S540 to be described later, and a new machine learning model is added. On the other hand, when there is the machine learning model of which the number of classes is less than the upper limit value, the process proceeds to step S520 and the new machine learning model is updated.

In step S520, the class classification process section 114 updates the machine learning model for which the number of classes is less than the upper limit value so that the number of channels in the highest layer is increased by one. In the present embodiment, the number of channels (n2+1) in the highest layer of the second machine learning model 202 is changed from 3 to 4. In step S530, the class classification process section 114 performs learning on the machine learning model updated in step S520. At the time of the learning, the target spectral data acquired in step S220 of FIG. 13 is used as new training data together with a training data group TD2 for the second machine learning model 202 that has been used so far. As the new training data, it is preferable to use a plurality of other spectroscopic spectrum data obtained from spectrometry of the same printing medium PM, in addition to the target spectral data acquired in step S220. Therefore, it is preferable that the spectrometer 30 is configured to acquire spectroscopic spectrum data at a plurality of positions of one printing medium PM. When the learning is completed in this way, the updated machine learning model 202 has a known class corresponding to the target spectral data. Therefore, it is possible to recognize the type of the printing medium PM by using the updated machine learning model 202.

In step S540, the class classification process section 114 adds a new machine learning model having a class corresponding to the target spectral data and sets a parameter thereof. The new machine learning model preferably has the same configuration as the first machine learning model 201 illustrated in FIG. 4, except for the number of channels in the highest layer. For example, the new machine learning model preferably has two or more known classes similar to the second machine learning model 202 illustrated in FIG. 5. One of two or more known classes is the class corresponding to the target spectral data. In addition, at least one of the two or more known classes is preferably the same as at least one known class of the existing machine learning model. Making one class of a new machine learning model the same as a known class of the existing machine learning model is realized by training the new machine learning model using the same training data as training data used to perform learning on the existing machine learning model for the known class. The reason for providing two or more known classes in the new machine learning model is that the learning may not be performed with sufficient accuracy when there is only one known class.

As the class of the existing machine learning model to be adopted in the new machine learning model, for example, it is preferable to select from the following classes.

(a) A class corresponding to the optical spectrum data having the highest similarity to the target spectral data among the plurality of known classes in the existing machine learning model.

(b) A class corresponding to the optical spectrum data having the lowest similarity to the target spectral data among the plurality of known classes in the existing machine learning model.

(c) An erroneously determined class to which the target spectral data in step S240 of FIG. 13 belongs among the plurality of known classes in the existing machine learning model.

Among these, adopting the class (a) or (c) makes it possible to reduce erroneous discrimination in the new machine learning model. In addition, adopting the class (b) makes it possible to shorten a learning time of the new machine learning model.

In step S550, the class classification process section 114 performs learning on the added machine learning model. In the learning, the target spectral data acquired in step S220 of FIG. 13 is used as new training data. Further, as the new training data, it is preferable to use a plurality of other spectroscopic spectrum data obtained from spectrometry of the same printing medium PM, in addition to the target spectral data acquired in step S220. Further, when one or more classes of a new machine learning model are the same as a known class of the existing machine learning model, training data used for performing learning on the existing machine learning model for the known class is also used.

When the number of known classes of the second machine learning model 202 reaches the upper limit value, the third machine learning model is added by steps S540 and S550 of FIG. 20. The same applies to the fourth and subsequent machine learning models. As described above, in the present embodiment, when N is an integer of 2 or more, (N−1) machine learning models have the number of classes equal to the upper limit value, and the other one machine learning model has the number of classes of the upper limit value or less. Furthermore, when it is determined that the target spectral data belongs to an unknown class at the time of executing the class classification process for the target spectral data is executed using N machine learning models, one of the following processes is executed.

(1) When the other one machine learning model has the number of classes less than the upper limit value, for the other one machine learning model, a new class for the target spectral data is added by performing learning using the training data including the target spectral data by the process of steps S520 and S530.

(2) When the other one machine learning model has the number of classes equal to the upper limit value, a new machine learning model having a class corresponding to the target spectral data is added by the process of steps S540 and S550.

According to the processes, even when the class classification of the target spectral data cannot be performed well with the N machine learning models, it is possible to classify the target spectral data into the class corresponding to the target spectral data.

The update process of the machine learning model illustrated in FIG. 20 can be executed when the number of existing machine learning models is one. When the number of existing machine learning models is one, for example, the second machine learning model 202 illustrated in FIG. 5 is not prepared, and the process of FIG. 13 may be executed using only the first machine learning model 201 illustrated in FIG. 4. In this case, steps S540 and S550 in FIG. 20 are processes of adding the second machine learning model 202 as a new machine learning model. As such, in the class classification process performed using only the first machine learning model 201, it is possible to understand the processing of adding the second machine learning model 202 as a new machine learning model when it is determined that the input data belongs to an unknown class, as an example of a process of preparing two machine learning models 201 and 202.

In step S560, the class classification process section 114 inputs the training data again to the updated or added machine learning model to generate a known feature spectrum group.

As described above, when N is an integer of 2 or more in the present embodiment, since the class classification process is executed using N machine learning models, the process can be executed at a higher speed than a case where one machine learning model is subjected to class classification process into a plurality of classes. Furthermore, when the existing machine learning model cannot classify the classified data well, it is possible to perform class classification into the class corresponding to the classified data by adding the class to the existing machine learning model or adding the new machine learning model into the existing machine learning model.

In the description above, a vector neural network type machine learning model using vector neurons is used, but instead, a machine learning model using scalar neurons like a normal convolutional neural network may be used. However, the vector neural network type machine learning model is preferable in that the accuracy of the class classification process is higher than that of the machine learning model using the scalar neurons.

*Method for Operating Output Vector of Each Layer in Machine Learning Model*

The method for operating the output of each layer in the first machine learning model 201 illustrated in FIG. 4 is as follows. The same applies to the second machine learning model 202.

Each node of the PrimeVN layer 221 regards the scalar output of the 1×1×32 nodes of the Conv layer 211 as a 32-dimensional vector, and the output of the vector of the node is obtained by multiplying the vector by a transformation matrix. The transformation matrix is an element of the 1×1 kernel and is updated by performing learning on the machine learning model 201. It is also possible to integrate the processes of the Conv layer 211 and the PrimeVN layer 221 to form the processes as one primary vector neuron layer.

When the PrimeVN layer 221 is called the "lower layer L" and the ConvVN1 layer 231 adjacent to a higher level side is called the "higher layer L+1", the output of each node of the higher layer L+1 is determined using the following Equation:

$$v_{ij} = W_{ij}^{L} M_{i}^{L} \tag{2}$$

$$u_j = \sum_i v_{ij} \tag{3}$$

-continued $$a_j = F(\|u_j\|) \tag{4}$$

$$M_j^{L+1} = a_j \times \frac{1}{\|u_j\|} u_j \tag{5}$$

wherein,

- MLi is an output vector of the i-th node in the lower layer L,
- ML+1j is an output vector of the j-th node in the higher layer L+1,
- vij is a prediction vector of the output vector ML+1j,
- WLij is a prediction matrix for calculating the prediction vector vij from the output vector MLi of the lower layer L,
- uj is a sum of the prediction vector vij, that is, a sum vector as a linear combination,
- aj is an activation value, which is a normalization coefficient obtained by normalizing the norm |uj| of the sum vector uj, and
- F(X) is a normalization function for normalizing X.

As the normalization function F(X), for example, the following Equation (4a) or Equation (4b) can be used:

$$a_j = F(\|u_j\|) = \text{softmax}(\|u_j\|) = \frac{\exp(\beta\|u_j\|)}{\sum_k \exp(\beta\|u_k\|)} \tag{4a}$$

$$a_j = F(\|u_j\|) = \frac{\|u_j\|}{\sum_k \|u_k\|} \tag{4b}$$

wherein,

- k is an ordinal number for all nodes in the higher layer L+1, and
- β is an adjustment parameter that is an any positive coefficient, for example, β=1.

In Equation (4a), the activation value aj is obtained by normalizing the norm |uj| of the sum vector uj with a softmax function for all the nodes of the higher layer L+1. On the other hand, in Equation (4b), the activation value aj is obtained by dividing the norm |uj| of the sum vector uj by the sum of the norms |uj| for all the nodes of the higher layer L+1. As the normalization function F(X), a function other than Equation (4a) or Equation (4b) may be used.

The ordinal number i of Equation (3), which is assigned to the node of the lower layer L used for determining the output vector ML+1j of the j-th node in the higher layer L+1 for convenience, takes a value of 1 to n. In addition, an integer n is the number of nodes in the lower layer L that is used for determining the output vector ML+1j of the j-th node in the higher layer L+1. Therefore, the integer n is given by the following Equation:

$$n = Nk \times Nc \tag{6}$$

wherein, Nk is the number of kernel elements, and Nc is the number of channels of the PrimeVN layer 221 as the lower layer. In the example of FIG. 4, since Nk=3 and Nc=26, n=78.

One kernel used to obtain the output vector of ConvVN1 layer 231 has 78 elements in which the kernel size 1×3 is used as a surface size and the number of channels of the lower layer of 26 is used as a depth (1×3×26=78), and each of which is a prediction matrix WLij. In addition, 20 sets of the kernel are required to generate the output vectors of 20 channels of ConvVN1 layer 231. Therefore, the number of kernel prediction matrices WLij used to obtain the output vector of the ConvVN1 layer 231 is 78×20=1560. The prediction matrices WLij are updated by training the machine learning model 201.

As can be seen from Equations (2) to (5) described above, the output vector ML+1j of each node of the higher layer L+1 is obtained by the following operation of:

(a) multiplying the output vector MLi of each node in the lower layer L by the prediction matrix WLij to obtain the prediction vector vij, (b) obtaining the sum vector uj, which is the sum of the prediction vector vij obtained from each node in the lower layer L, that is, a linear combination, (c) obtaining the activation value aj, which is a normalization coefficient obtained by normalizing the norm |uj| of the sum vector uj, and (d) dividing the sum vector uj by the norm |uj| and further multiplying the activation value aj.

The activation value aj is a normalization coefficient obtained by normalizing the norm |uj| for all the nodes in the higher layer L+1. Thus, the activation value aj can be considered as an index showing a relative output intensity of each node among all the nodes in the higher layer L+1. The norms used in Equations (4), (4a), (4b), and (5) are typically L2 norms representing vector lengths. At this time, the activation value aj corresponds to a vector length of the output vector ML+1j. Since the activation value aj is only used in Equations (4) and (5), it does not need to be output from the node. However, it is also possible to configure the higher layer L+1 so as to output the activation value aj to the outside.

The configuration of the vector neural network is almost the same as the configuration of the capsule network, and the vector neurons of the vector neural network correspond to the capsules of the capsule network. However, the operations according to Equations (2) to (5) used in the vector neural network are different from the operations used in the capsule network. The biggest difference between the vector neural network and the capsule network is that in the capsule network, the prediction vector vij on the right side of Equation (3) is each multiplied by a weight, and the weight is searched for by repeating dynamic routing plural times. On the other hand, since the vector neural network of the present embodiment has an advantage in that the output vector ML+1j can be obtained by calculating Equations (2) to (5) once in order, so that it is not necessary to repeat the dynamic routing and the operation is performed faster. Furthermore, the vector neural network of the present embodiment has an advantage in that an amount of memory required for the operation is smaller than that of the capsule network. Thus, according to the experiment by the inventors of the present disclosure, the operation has been made using substantially ½ to ⅓ of the amount of memory.

A vector neural network is the same as a capsule network in that the vector neural network uses a node that inputs and outputs a vector. Thus, the advantages of using vector neurons are also common to the capsule network. Further, the plurality of layers 211 to 251 represent features of a larger region as the layers 211 to 251 approach the higher layer, and represent features of a smaller region as the layers 211 to 251 approach the lower layer, which is the same as a normal convolutional neural network. Here, the "feature" means a feature included in the input data to the neural network. The vector neural network and capsule network are superior to the normal convolutional neural network in that the output vector of a certain node includes spatial information that represents spatial information of the feature represented by the node. That is, the vector length of the output vector of a certain node represents an existence probability of the feature represented by the node, and a vector direction represents spatial information such as a direction or scale of the feature. Therefore, the vector directions of the output vectors of the two nodes belonging to the same layer represent a positional relationship of each feature. Alternatively, it can be said that the vector directions of the output vectors of the two nodes represent a variation of the feature. For example, when a node corresponds to the feature of "eyes", the direction of the output vector can represent variations such as thinness of eyes and how to lift eyes. It can be said in the normal convolutional neural network that the spatial information of the feature is lost by a pooling process. As a result, the vector neural network and the capsule network have an advantage in that they are superior in the performance of identifying the input data as compared with the normal convolutional neural network.

The advantage of vector neural network can also be considered as follows. That is, the vector neural network has an advantage in that the output vector of the node represents features of the input data as coordinates in a continuous space. Therefore, once the vector direction is close, the output vector can be evaluated as if the features are similar. Furthermore, even if the features included in the input data cannot be covered by the training data, the vector neural network has an advantage in that the features can be discriminated by interpolation. On the other hand, the normal convolutional neural network has a drawback that the features of the input data cannot be represented as coordinates in the continuous space due to chaotic compression caused by the pooling process.

Since the outputs of the nodes of the ConvVN2 layer 241 and the ClassVN layer 251 are also determined in the same manner using Equations (2) to (5), detailed description thereof will be omitted. The resolution of the ClassVN layer 251, which is the highest layer, is 1×1, and the number of channels is (n1+1).

The output of the ClassVN layer 251 is converted into a plurality of determination values Class1-1 and Class1-2 for a known class and a determination value Class1-UN indicating that the class is an unknown class. Generally, the determination values are values normalized by the softmax function. Specifically, for example, an operation of calculating the vector length of the output vector from the output vector of each node of the ClassVN layer 251 and normalizing the vector length of each node by the softmax function can be performed, such that a determination value for each class can be obtained. As described above, the activation value aj obtained by Equation (4) is a value corresponding to the vector length of the output vector ML+1j, and is normalized. Thus, the activation value aj in each node of the ClassVN layer 251 may be output and used as a determination value for each class as it is.

In the above-described embodiment, a vector neural network for obtaining the output vector by the operations of Equations (2) to (5) is used as the machine learning models 201 and 202, but instead of the vector neural network, the capsule network disclosed in U.S. Pat. No. 5,210,798 and WO2019/083553 may be used. In addition, a neural network using only the scalar neurons may be used.

A method for generating the known feature spectrum groups KS1 and KS2 and a method for generating the output data of an intermediate layer such as the ConvVN1 layer are not limited to the above embodiments, and for example, the Kmeans method may be used to generate these data. In addition, these data may be generated using conversion such as PCA, ICA, or Fisher. Further, the method for converting the output data of the known feature spectrum group KSG and the intermediate layer may be different.

*Addition/Learning Mode of New Printing Medium*

Figure 21:
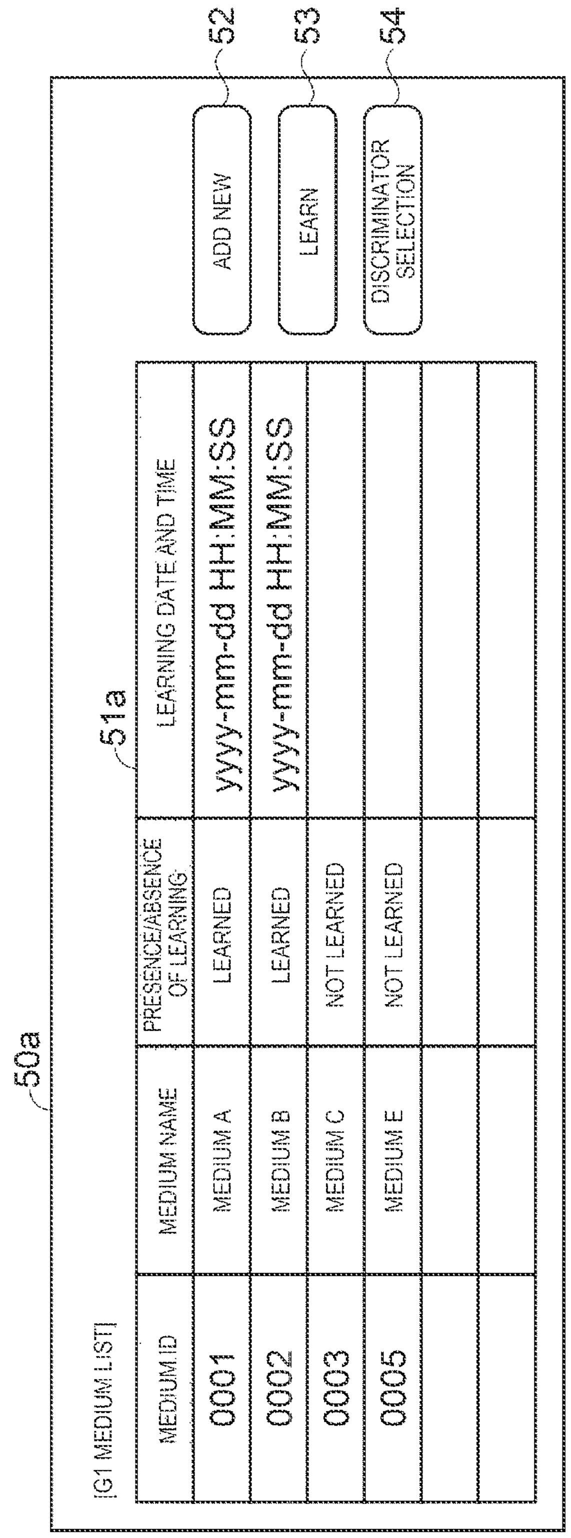
FIG. 21 is a diagram illustrating an example of a setting screen of the printing medium.

FIG. 21 is a diagram illustrating an example of a setting screen of the printing medium.

FIG. 21 is a diagram illustrating an example of a setting screen used when the user using the printing system 100 (printing apparatus 110) adds a new printing medium or confirms a learning state of the printing medium. The display section 150 (for example, FIG. 1) of the information processing device 20 displays a screen 50*a* as a first screen of FIG. 21 by executing a printing medium management program of the information processing device 20 by the user. The machine learning processing method in the printing system 100 has been described in the description above, but here, a GUI setting screen will be mainly described.

The screen 50*a* of FIG. 21 is provided with a printing medium list 51*a*, an add new button 52, a learn button 53, a discriminator selection button 54, and the like. The discriminator is a learning group in which the learning section 117 has completed the learning of the machine learning model using the physical information and the type information of the printing medium PM. For example, the learning group that has been learned by the learning section 117 using the spectral data groups SD1 and SD2 of FIG. 9 and the machine learning models 201 and 202 of FIGS. 4 and 5 is also referred to as a discriminator.

In the printing medium list 51*a*, an ID number of the printing medium, a medium name which is a name of the printing medium, the presence/absence of learning, and the learning date and time are displayed in a list. The ID number corresponds to the medium identifier described above. The presence/absence of learning is a column for displaying the learning state of machine learning of the corresponding printing medium, and is displayed as "learned" when machine learning has been completed and "not learned" when machine learning has not been performed. As the learning date and time, the date and time when the learning was performed is displayed. In other words, the display section 150 of the information processing device 20 displays the screen 50*a* for displaying a learning state including whether or not the printing medium is a printing medium used for machine learning.

For example, on the screen 50*a* of FIG. 21, a list of four printing media are displayed, and a medium A having an ID number 0001 and a medium B having an ID number 0002 are displayed as that the learning has been completed. The learning date and time of both the medium A and the medium B are also displayed. On the other hand, a medium C of an ID number 0003 is not learned, a medium E of an ID number 0005 is also not learned, and the column of the learning date and time is blank. The presence/absence of learning is determined by the discriminator management section 118 (FIG. 3) functioning as a learning state determination section. The details of the learning state determination section will be described later.

The add new button 52 is an operation button used when adding a new printing medium.

The learn button 53 is an operation button for confirming the learning state.

The discriminator selection button 54 is an operation button for selecting a discriminator corresponding to the learning group.

Further, "G1: Medium list" is displayed on the upper left of the screen 50*a*. G1 is an identification number of the discriminator, and the medium list is a list of the printing medium. The printing medium related to the discriminator 1 is displayed in the printing medium list 51*a*.

Figure 22:
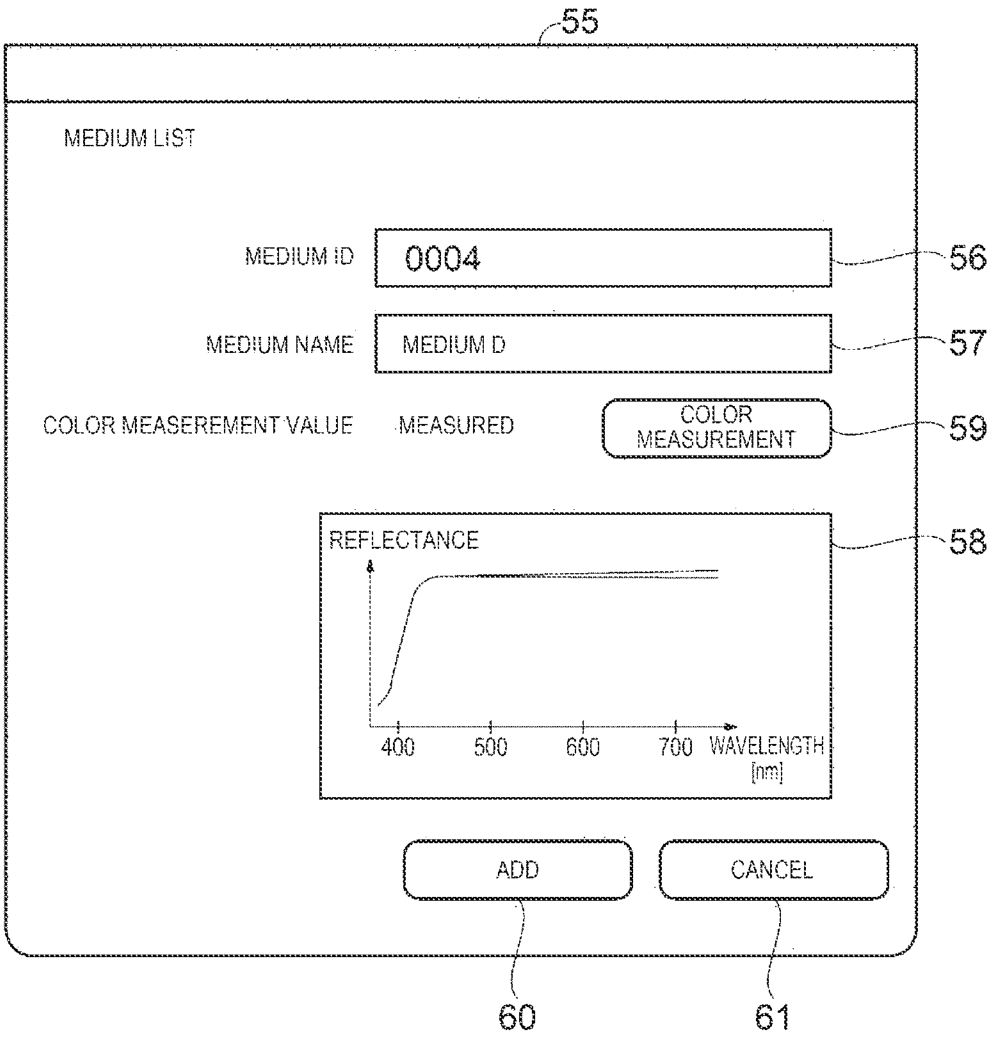
FIG. 22 is a diagram illustrating an example of an additional setting screen of the printing medium.

FIG. 22 is a diagram illustrating an example of an additional setting screen of the printing medium.

When adding a new printing medium, press the add new button 52 of the screen 50*a*. When the add new button 52 is operated, the setting screen is switched and a screen 55 of FIG. 22 is displayed.

In an initial state of switching the screen, both the ID number column 56 and the medium name column 57 of the screen 55 are blank, and the ID number and the medium name can be input. The screen 55 of FIG. 22 shows a state after the user inputs in each column, and the ID number: 0004 and the medium name: medium D are input. When the ID number and the medium name are input, the discriminator management section 118 (FIG. 3) confirms whether or not the storage section 120 has a record of the spectral data of the input medium D of the ID number 0004. At this time, the discriminator management section 118 functions as a learning state determination section. Specifically, the discriminator management section 118 confirms the data related to the medium D or the learning history as the learning state determination section.

When there is spectral data recording of the medium D, a graph 58 showing the spectral data is displayed as shown on the screen 55. A horizontal axis of the graph 58 is a wavelength (nm), and a vertical axis is a reflectance. In addition, when there is no recording, the spectral data of the medium D can be measured by the spectrometer 30 by operating a color measurement button 59 on the right side of the screen 55. In this case, it is necessary to set the medium D in the printing medium holder 40.

Then, when the medium D is added to the "G1: medium list", an add button 60 on the lower side of the screen 55 is operated. When the medium D is not added to the "G1: medium list", a cancel button 61 is operated. When the cancel button 61 is pressed, the process after pressing the add new button 52 on the screen 50*a* of FIG. 21 is canceled, and the screen returns to the screen 50*a* of FIG. 21.

Figure 23:
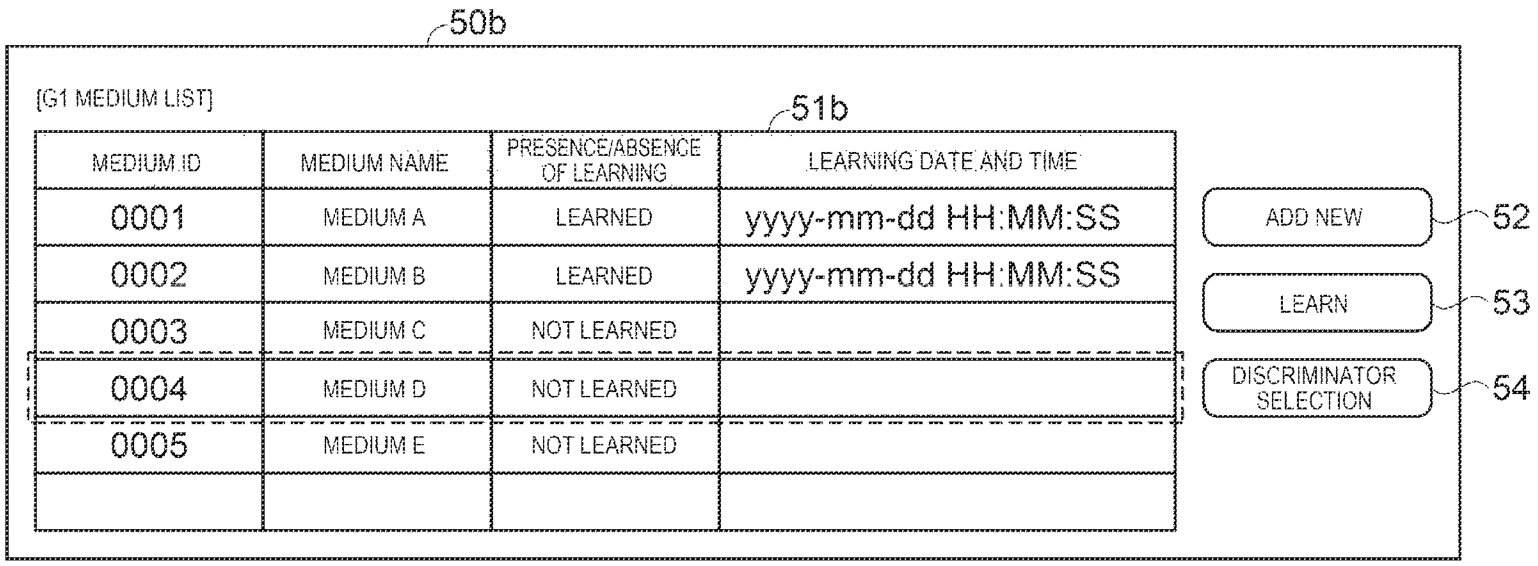
FIG. 23 is a diagram illustrating an example of a setting screen of the printing medium.

When the add button 60 is pressed on the screen 55 of FIG. 22, the screen 55 switches to the screen 50*b* of FIG. 23. The medium D is added with the ID number 0004 to the printing medium list 51*b* of the screen 50*b* of FIG. 23. The learning date and time column is blank. This is because the discriminator management section 118 as the learning state determination section determines that the learning has not been performed as a result of confirming the learning history of the medium D. In other words, the discriminator management section 118 as the learning state determination section determines whether or not the medium D is a recording medium used for machine learning. The other screen modes on the screen 50*b* are the same as those on the screen 50*a* in FIG. 21.

When the medium D is machine-learned, the learn button 53 is pressed on the screen 50*b* of FIG. 23. When the learn button 53 is operated, the screen 50*b* is switched to the screen 62 in FIG. 24. In the printing medium list of the screen 62, a learning column is added to the leftmost column. A check box for selecting a medium is provided in the learning column, and the medium to be learned can be selected.

Figure 24:
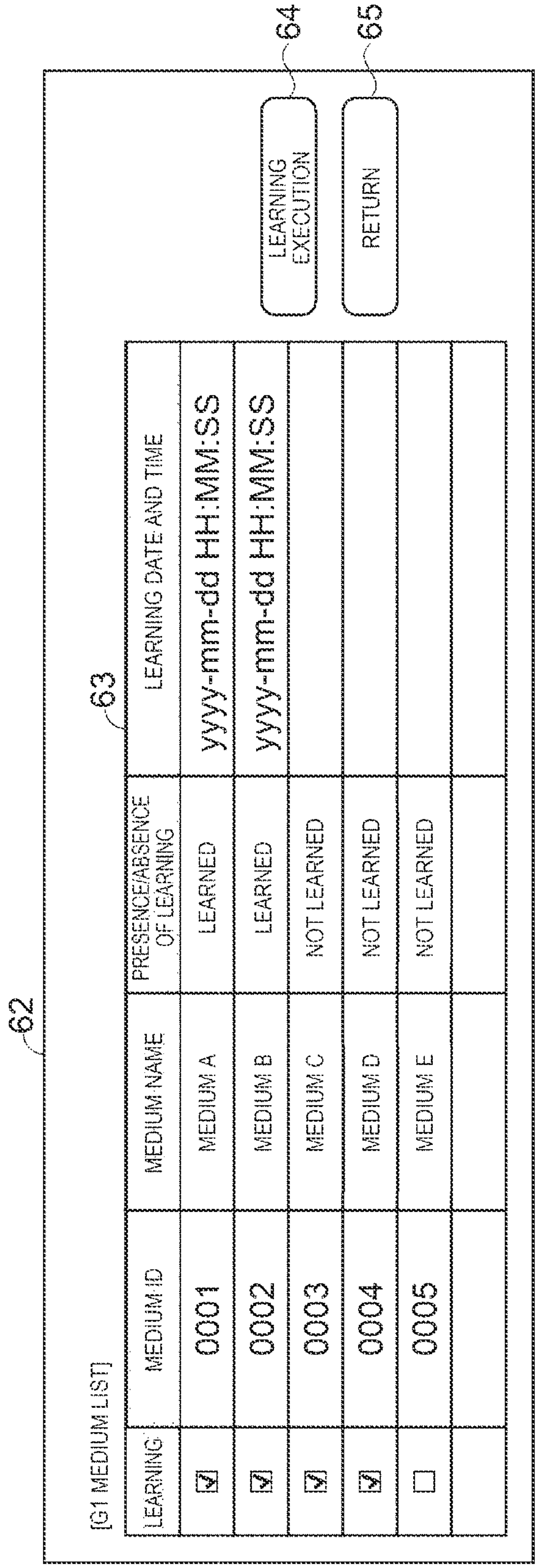
FIG. 24 is a diagram illustrating an example of a setting screen of the printing medium.

For example, the medium A, the medium B, the medium C, and the medium D are selected by the check boxes on the screen 62 of FIG. 24. In addition, a learning execution button 64 and a back button 65 are provided on the screen 62 as operation buttons. When the back button 65 is pressed, learning is not performed and the screen 62 returns to the screen 50*b* of FIG. 23.

*Method for Discriminating Whether or Not recording medium Is Used for Machine Learning*

In the description above, a method for discriminating whether or not the printing medium is a printing medium used for machine learning, which has been described using the plurality of setting screens, will be organized.

The method for discriminating whether or not the printing medium is a printing medium used for machine learning has a plurality of machine learning models and includes, for each of the plurality of machine learning models, (h) obtaining a discriminator that has been machine-learned using physical characteristics and type information of the printing medium by the learning section 117, (i) determining whether or not the printing medium is the printing medium used for machine learning by the discriminator management section 118 as a learning state determination section, and (j) displaying a determination result on the display section 150.

*Accuracy Confirmation During Learning*

Figure 25:
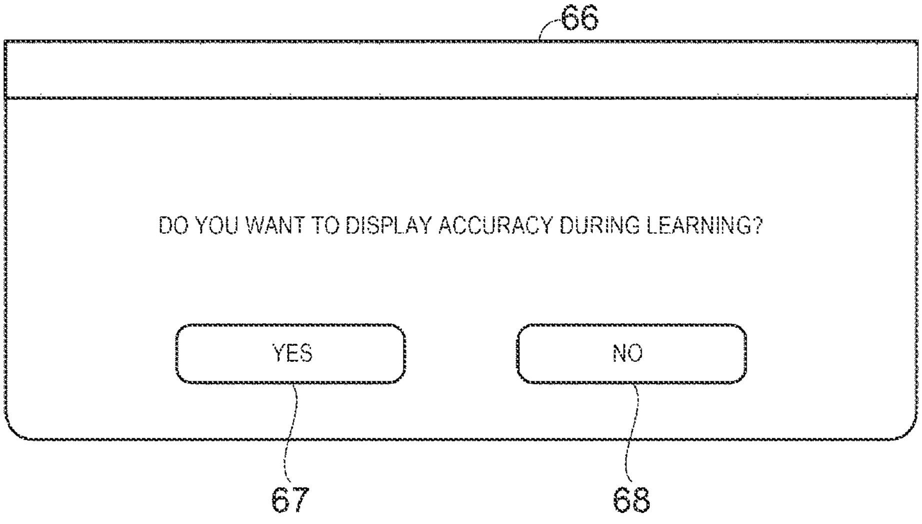
FIG. 25 is a diagram illustrating an example of a confirmation screen in setting the printing medium.

When the learning execution button 64 is pressed on the screen 62 of FIG. 24, machine learning of the medium A to the medium D starts, and a screen 66 of FIG. 25 is superimposed and displayed.

A message "Do you want to display accuracy during learning?", a yes button 67, and a no button 68 are displayed on the screen 66. When pressing the yes button 67, the screen 66 is switched to a screen 69 of FIG. 26. Further, when the no button 68 is pressed, the screen 69 is not displayed, and the screen 69 is switched to a screen 71 of FIG. 27 as soon as the learning is completed.

Figure 26:
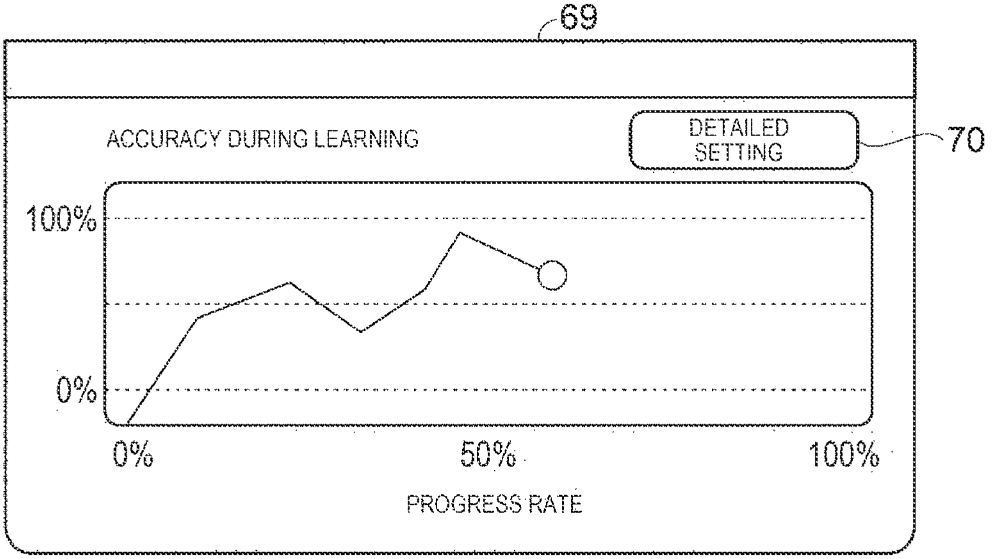
FIG. 26 is a diagram illustrating an example of a screen showing transition of discrimination accuracy during learning.

The screen 69 of FIG. 26 is a graph showing the accuracy during learning, and a horizontal axis represents a learning progress rate (%) and a vertical axis represents a discrimination accuracy (%). Here, the discrimination accuracy is calculated, by the discriminator management section 118 (FIG. 3) whether or not spectral information is discriminated as an intended identifier by inputting the spectral information of the printing medium of accuracy evaluation data to the discriminator. The accuracy evaluation data is dedicated to evaluation data and uses the spectral information different from that at the time of learning in the discriminator. For example, in the screen 69, spectral information for accuracy evaluation different from that at the time of learning is input to the discriminator 1, and a ratio discriminated by the intended identifier is set as a discrimination accuracy. At this time, the discriminator management section 118 functions as an accuracy evaluation section.

At a point in time when the learning progress rate is 60%, a state in which the discrimination accuracy is substantially 70% is confirmed on the screen 69. When the learning is completed and the progress rate reaches 100%, the screen 69 is switched to the screen 71 of FIG. 27. The screen 71 is provided with a message "learning is completed.", a warning mark, a yes button 72, and a no button 73. A message "as a result of adding paper information of ID0004, accuracy is 82%. Do you want to add this paper?" is displayed next to the warning mark. This indicates that in the accuracy graph of the screen 69, the discrimination accuracy at a point in time when the learning (progress 100%) is completed is 82%. When the no button 73 is pressed, the screen 71 returns to the screen 62 of FIG. 24 before learning.

Figure 28:
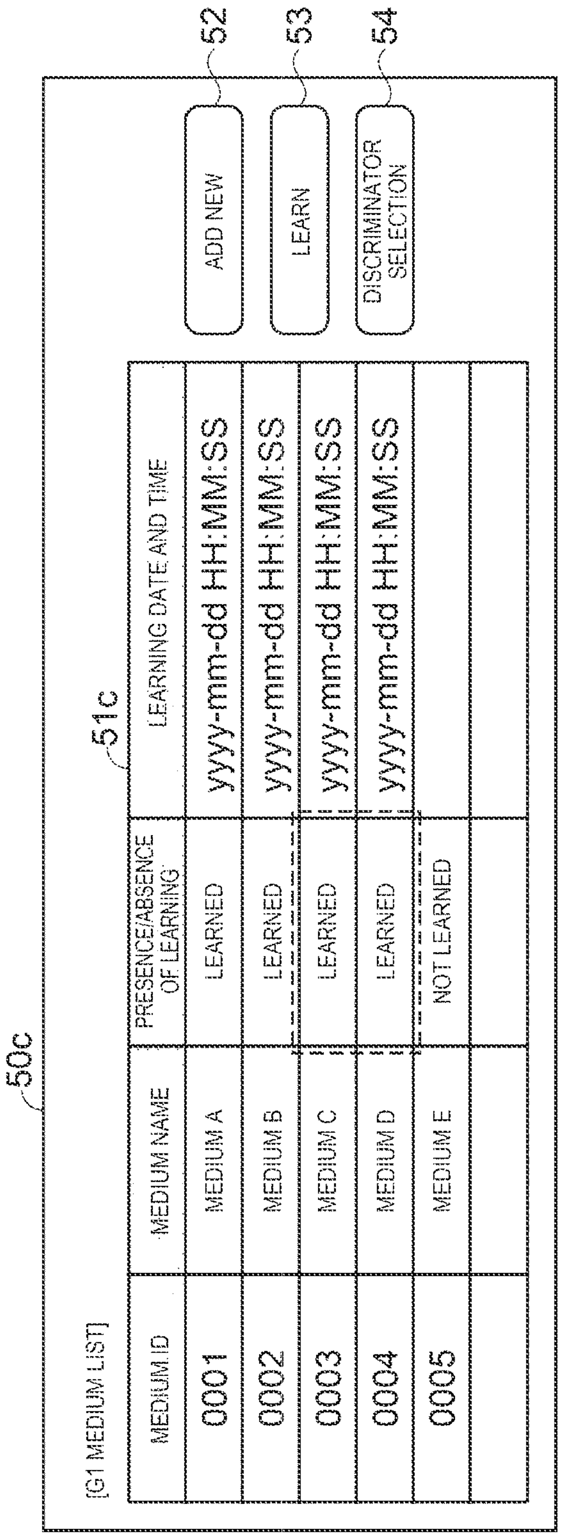
FIG. 28 is a diagram illustrating an example of a setting screen of the printing medium.

When pressing the yes button 72, the screen 71 is switched to a screen 50*c* of FIG. 28. In a printing medium list 51*c* on the screen 50*c*, both the medium C and the medium D are displayed as "learned". A learning date and time are also recorded. This is because the discriminator management section 118 as the learning state determination section determines that the printing medium is a printing medium that uses the medium C and the medium D for machine learning.

Furthermore, machine learning performed until the learning progress rate reaches 100% has been described, but the present disclosure is not limited to this, and when the discrimination accuracy is equal to or higher than a predetermined discrimination accuracy, the machine learning may be completed.

For example, when the detailed setting button 70 is pressed, a screen (not illustrated) on which a target discrimination accuracy can be input is displayed on the screen 69 of FIG. 26. For example, when the target discrimination accuracy is input at 80%, the machine learning can be completed at a point in time when the discrimination accuracy is 80% or more in the graph on the screen 69. According to this, it is possible to obtain a discriminator with a required discrimination accuracy even during learning, which is efficient.

Figure 27:
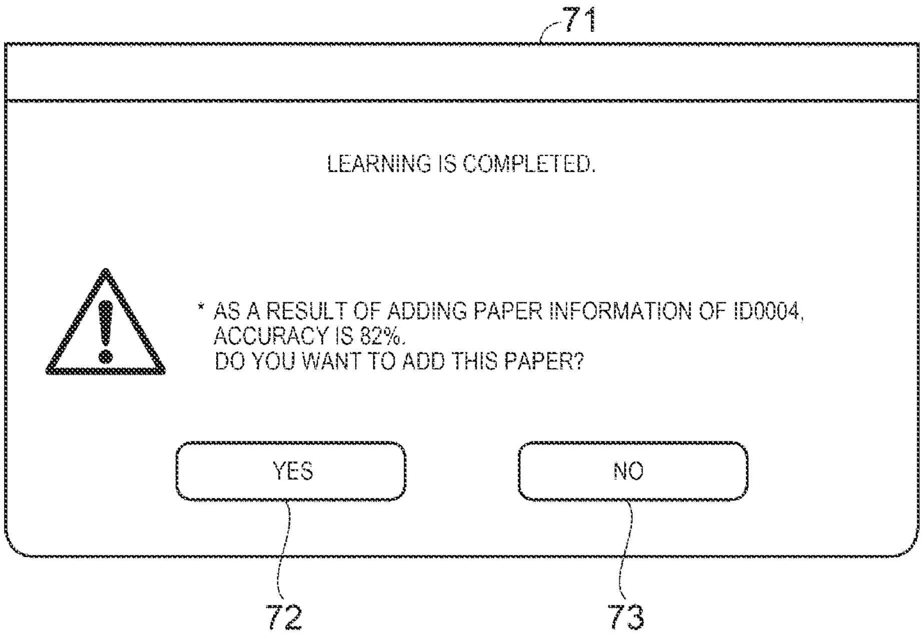
FIG. 27 is a diagram illustrating an example of a confirmation screen in setting the printing medium.

Furthermore, as a result of the medium D being machine-learned with the discriminator 1 in the description above, as shown in the screen 71 of FIG. 27, the discrimination accuracy was 82%. However, the discrimination accuracy with another discriminator was not confirmed. In the machine learning model, there is a case where better discrimination accuracy can be obtained by learning with another discriminator, and it is thus preferable to confirm the discrimination accuracy with another discriminator as well.

For example, when the discriminator selection button 54 on the screen 50*a* of FIG. 21 is pressed, selectable discriminators are displayed in a list (not illustrated). A discriminator other than the discriminator 1 can be selected from the discriminators, and the medium D can be newly added by the above-described method for machine learning. Specifically, a plurality of discriminators obtained by each of the plurality of machine learning models are provided, and the learning section 117 changes the machine learning model when the discrimination accuracy is less than a predetermined discrimination accuracy. As a result, when the discrimination accuracy is not enhanced, it is possible to select a machine learning model that may further enhance the discrimination accuracy of the discriminator. The discriminator selection button 54 may be operated from the screen 50*b* of FIG. 23 and the screen 50*c* of FIG. 28.

Alternatively, when the discrimination accuracy is less than the predetermined discrimination accuracy, a process of changing the discriminator may be programmed and performed by the learning section 117 (FIG. 3).

Figure 29:
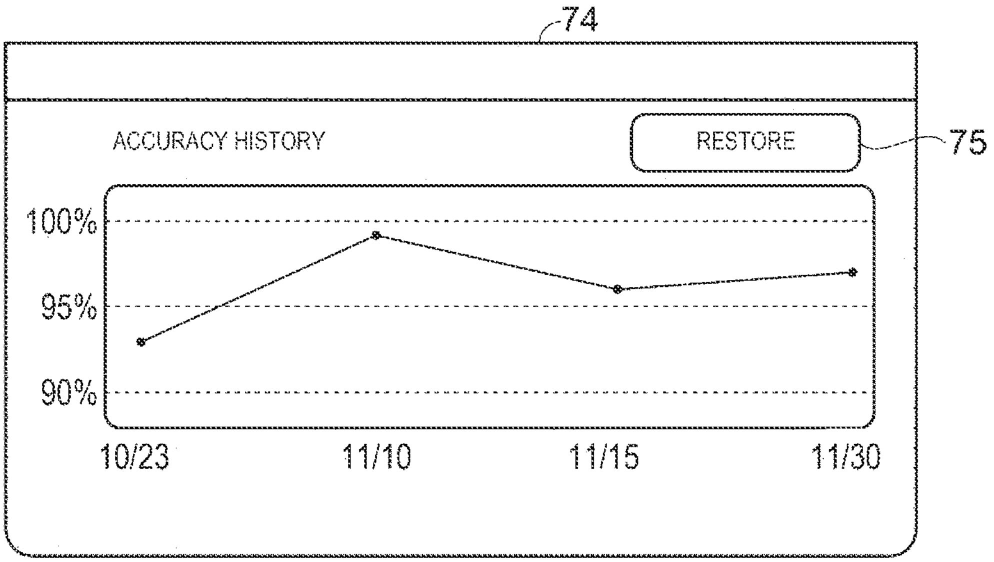
FIG. 29 is a diagram illustrating an example of a screen showing a discrimination history of a discriminator.

FIG. 29 is a graph showing a discrimination accuracy history in the discriminator.

Further, the storage section 120 stores the discrimination accuracy history for each discriminator and a machine learning history corresponding to the discrimination accuracy. For example, when a specific discriminator is selected by operating the discriminator selection button 54 on the screen 50*a* of FIG. 21, a history button (not illustrated) is displayed. When pressing the history button, a screen 74 of FIG. 29 is displayed. The screen 74 of FIG. 29 is a graph showing the discrimination accuracy history in the selected discriminator, in which a horizontal axis represents a learning date and time, and a vertical axis represents a discrimination accuracy (%). As shown in the graph, the discrimination accuracy that the discrimination accuracy was 93% as of learning as of October 23, then 98% on November 10, 96% as of November 15, and 97% as of November 30 can be grasped in time series. Currently, the latest discriminator as of November 30 is set.

Here, the screen 74 is provided with a restore button 75. When the restore button 75 is pressed, a discrimination accuracy point in the graph can be selected. For example, when the discriminator as of November 10, which has the highest discrimination accuracy, needs to be restored, the discrimination accuracy point of 98% is selected. When selecting the discrimination accuracy point, a message "Do you want to restore discriminator on November 10?", and a yes button and a no button (none of which illustrated) are displayed. When pressing the yes button, restore is performed. The restore of the discriminator is performed in the discrimination accuracy selected by the learning section 117 based on the discrimination accuracy history for each discriminator and the machine learning history in the storage section 120.

*Method for Confirming Discrimination Accuracy in Discrimination Process of Printing Medium*

In the description above, a method for confirming a discrimination accuracy in the discrimination process of the printing medium, which has been described using the plurality of setting screens, will be organized.

The method for confirming a discrimination accuracy has a plurality of machine learning models and includes, for each of the plurality of machine learning models, (h) obtaining a discriminator that has been machine-learned using physical characteristics and type information of the printing medium by the learning section 117, (l) obtaining a discrimination accuracy using an accuracy evaluation data different from the physical characteristics of the printing medium used for machine learning by the discriminator management section 118 as an accuracy evaluation section, and (m) displaying a determination result on the display section 150.

As described above, the following effects can be obtained according to the printing apparatus 110, the printing system 100, the method for discriminating a printing medium, the method for confirming a discrimination accuracy, and the method for discriminating a printing medium of the present embodiment.

The printing apparatus 110 includes the storage section 120 that stores a printing parameter corresponding to physical information and type information of the printing medium PM, the printing machine 11 that performs printing based on the printing parameter, the learning section 117 that obtains a discriminator which has been machine-learned using the physical information and the type information of the printing medium PM, and the discriminator management section 118 that determines whether or not the printing medium is a printing medium used for machine learning of the discriminator as a learning state determination section. The printing system 100 also includes the storage section 120, the printer 10, the learning section 117, and the discriminator management section 118, which function in the same manner as each section of the printing apparatus 110.

According to this, the learning section 117 obtains a machine-learned discriminator using the physical information and the type information of the printing medium PM. Then, the discriminator management section 118 as the learning state determination section determines whether or not the printing medium PM is a printing medium used for machine learning of the discriminator.

Therefore, it is possible to provide the printing apparatus 110 and the printing system 100 capable of determining whether or not the printing medium PM is the printing medium used for machine learning of the discriminator. In other words, it is possible to provide a recording apparatus and a recording system capable of identifying a learning state of the recording medium.

The printing system 100 includes the learning section 117 that obtains a discriminator which has been machine-learned using the physical information and type information of the printing medium PM, and the discriminator management section 118 that obtains the discrimination accuracy of the discriminator as an accuracy evaluation section. The printing apparatus 110 also includes the learning section 117 and the discriminator management section 118, which function in the same manner as each section of the printing system 100.

According to this, the discrimination accuracy of the discriminator can be obtained by the discriminator management section 118 that functions as an accuracy evaluation section.

Therefore, it is possible to provide the printing system 100 (printing apparatus 110) capable of grasping and managing the discrimination accuracy of the discriminator.

The printing apparatus 110 further includes the storage section 120, accuracy evaluation data is stored in the storage section 120, and the discriminator management section 118 as the accuracy evaluation section obtains the discrimination accuracy by using the accuracy evaluation data. According to this, the discrimination accuracy can be obtained using the accuracy evaluation data.

Further, the accuracy evaluation data is data different from the physical characteristics of the printing medium used for machine learning of the corresponding discriminator.

When physical characteristic data of the recording medium used for machine learning is used, the accuracy is 100%, which is meaningless because the data has already been learned and can be reliably discriminated. According to this, an appropriate discrimination accuracy can be obtained by using data different from the physical characteristics of the recording medium used for machine learning as the accuracy evaluation data. In other words, an accurate discrimination accuracy can be obtained.

The printing apparatus 110 further includes the display section 150, and the display section 150 displays the screen 50*a*, the screen 50*b*, the screen 50*c*, and the screen 62 as a first screen that displays a learning state including whether or not the printing medium PM is a printing medium used for machine learning of the discriminator.

According to this, since the learning state of the printing medium is displayed on the display section 150, it is possible to inform the user of the learning state of the printing medium.

Further, on the screen 50*a*, a plurality of printing media PM used for printing by the printing machine 11 (printer 10) as a recording section are displayed, and a learning state for each printing medium PM is also displayed.

According to this, it is possible to inform the user of the learning state for each printing medium.

The learning state is also displayed on the screen 50*a* together with the type information of the printing medium PM.

According to this, it is possible to inform the user of the type information of the printing medium and the learning state of the recording medium together.

In addition, the learning date and time when the machine learning was performed by the learning section 117 is displayed on the screen 50*a*. According to this, it is possible to inform the user of the history of the learning date and time of the printing medium.

In addition, the learning section 117 performs machine learning on the printing medium selected according to the type information of the printing medium in the screen 50*a*.

According to this, the user can select an any recording medium and perform machine learning.

Further, the display section 150 displays a screen 69 showing the discrimination accuracy. According to this, the user can recognize the discrimination accuracy on the screen 69.

Further, the discrimination accuracy according to the progress rate of machine learning is displayed on the screen 69 as a graph.

According to this, it is possible to grasp a change in discrimination accuracy according to the progress rate of machine learning.

Further, the learning section 117 completes machine learning when the discrimination accuracy during the progress of machine learning is equal to or higher than a predetermined discrimination accuracy.

According to this, since machine learning is completed at a point in time when the discrimination accuracy reaches the predetermined discrimination accuracy, a discriminator with good accuracy can be efficiently obtained.

Further, a plurality of discriminators obtained by each of the plurality of machine learning models are provided, and the learning section 117 changes the machine learning model when the discrimination accuracy is less than a predetermined discrimination accuracy.

According to this, when the discrimination accuracy does not increase, it is possible to select a machine learning model that may further enhance the discrimination accuracy of the discriminator.

Further, the storage section 120 stores the history of the discrimination accuracy for each discriminator and the history of machine learning corresponding to the discrimination accuracy.

According to this, the discrimination accuracy history and the machine learning history for each discriminator can be confirmed in the storage section 120.

Further, the learning section 117 restores the discriminator with a predetermined discrimination accuracy based on the discrimination accuracy history and the machine learning history recorded in the storage section 120.

According to this, the discriminator with a predetermined discrimination accuracy can be restored from the history of the storage section 120.

The method for discriminating whether or not the printing medium is a printing medium used for machine learning has a plurality of machine learning models and includes, for each of the plurality of machine learning models, obtaining a discriminator that has been machine-learned using physical characteristics and type information of the printing medium, determining whether or not the printing medium is the printing medium used for machine learning, and displaying a determination result.

According to the method, it is possible to determine whether or not the printing medium is the printing medium used for machine learning, and display the determination result.

Therefore, according to the discrimination method, it is possible to inform the user whether or not the recording medium is the recording medium used for machine learning of the discriminator.

The method for confirming a discrimination accuracy in the discrimination process of the printing medium has a plurality of machine learning models and further includes, for each of the plurality of machine learning models, obtaining a discriminator that has been machine-learned using physical characteristics and type information of the printing medium, obtaining a discrimination accuracy using an accuracy evaluation data different from the physical characteristics of the printing medium used for machine learning, and displaying a discrimination accuracy.

According to this, an appropriate discrimination accuracy can be obtained by using accuracy evaluation data different from the physical characteristics of the printing medium used for machine learning of the corresponding discriminator. Furthermore, the discrimination accuracy can be displayed to inform the user.

Therefore, it is possible to provide a method for confirming the discrimination accuracy capable of accurately obtaining the discrimination accuracy in the discrimination process of the printing medium.

Moreover, in a preferred example, the information processing device 20 adopts a notebook PC or a tablet PC. The printer 10 or the printing apparatus 110 may have a configuration of a large-sized apparatus that performs large-sized printing on a roll medium as a printing medium. In this case, since a distance between an operation panel of the printing apparatus 110 and the roll medium is separated from each other, it is difficult to perform work while confirming the actual roll medium. According to the present embodiment, the user who carries a wirelessly connected notebook PC or tablet PC goes to a location of the roll medium to enable performing the work at the location while confirming a type information label of the roll medium, and the work can thus be performed efficiently. Furthermore, in the preferred example, the notebook PC or the tablet PC includes an imaging unit, and can accurately and efficiently acquire roll medium type information from barcode information printed on the roll medium type information label. In addition, since the information processing device 20 may be an information terminal capable of executing a printing medium management program, a smartphone having the same functions as the tablet PC may be used.

Modification Example

This will be described with reference to FIG. 1.

In the description above, the spectral reflectance (spectral data) measured by the spectrometer 30 is used as the physical information of the printing medium PM, but the present disclosure is not limited to this, and the physical information of the printing medium PM may be used. For example, a spectral transmittance of light transmitted through the printing medium PM or image data obtained by imaging a surface of the printing medium may be used as the physical information. Alternatively, the printing medium PM may be irradiated with ultrasonic waves and a reflectance thereof may be used as physical information.

This will be described with reference to FIG. 3.

In the description above, it is assumed that the learning section 117, the discriminator management section 118 as the learning state determination section and the accuracy evaluation section, and the like function by the cooperation of each section of the information processing device 20. However, the present disclosure is not limited to this, and the learning section 117, the discriminator management section 118 as the learning state determination section and the accuracy evaluation section, and the like may be an information processing device capable of executing the printing medium management program. For example, a server or a PC placed in a cloud environment via the network NW may be used as the information processing device 20. According to this, it is possible to manage the printing apparatus 110 from a remote location, manage a plurality of printing apparatus 110 collectively, and the like.

The present disclosure is not limited to the above-described embodiment, and can be realized in various aspects in the scope without departing from the gist thereof. For example, the present disclosure can also be realized by the following aspects. The technical features in the embodiments corresponding to technical features in the aspects described below can be substituted or combined as appropriate in order to solve a part or all of the problems of the present disclosure or achieve a part or all of the effects of the present disclosure. Unless the technical features are explained as essential technical features in the present specification, the technical features can be deleted as appropriate.

(1) According to a first aspect of the present disclosure, there is provided a method for executing a discrimination process of a printing medium using a machine learning model. The method includes a step (a) of preparing N machine learning models when N is an integer of 1 or more, in which each of the N machine learning models is configured to discriminate a type of the printing medium by classifying input spectral data, which is a spectral reflectance of the printing medium, into any one of a plurality of classes, a step (b) of acquiring target spectral data which is a spectral reflectance of a target printing medium, and a step (c) of discriminating a type of the target printing medium by executing a class classification process of the target spectral data using the N machine learning models.

According to the method, since the class classification process is executed using the machine learning model, it is possible to accurately discriminate the printing medium having similar optical characteristics.

(2) In the above method, the step (c) may include a step of discriminating a medium identifier indicating the type of the target printing medium according to a result of the class classification process of the target spectral data, and the method may further include a step of selecting print setting for performing printing by using the target printing medium according to the medium identifier, and a step of performing printing by using the target printing medium according to the print setting.

According to the method, since the print setting is selected from a result of the discrimination process of the target printing medium, it is possible to create a clean printed matter using the target printing medium.

(3) In the above method, the N is an integer of 2 or more, and each of the N machine learning models may be configured to have at least one class different from that of the other machine learning models among the N machine learning models.

According to the method, since the class classification process is executed using two or more machine learning models, it is possible to execute the class classification process faster than a case of executing the class classification process on a plurality of classes in one machine learning model.

(4) In the above method, learning of the N machine learning models may be performed using corresponding N training data groups, and N spectral data groups constituting the N training data groups may be in a state equivalent to a state in which the N spectral data groups are grouped into N groups by a clustering process.

According to the method, since the spectral data used for learning of each machine learning model is grouped by the clustering process, it is possible to enhance the accuracy of the class classification process by the machine learning model.

(5) In the above method, each training data group may have a representative point representing a center of a spectral data group constituting each training data group, an upper limit value may be set for the number of classes capable of classifying by any one machine learning model, and a plurality of types of printing media, which are an object to be subjected to the class classification process by the N machine learning models, may be classified into any one of an essential printing medium that is not capable of being excluded from the object to be subjected to the class classification process without a user's exclusion instruction and an any printing medium that is capable of being excluded from the object to be subjected to the class classification process without the user's exclusion instruction. The step (a) may include a medium addition step of using a new additional printing medium, which is not the object to be subjected to the class classification process by the N machine learning models, as the object to be subjected to the class classification process, and the medium addition step may include a step (a1) of acquiring a spectral reflectance of the additional printing medium as additional spectral data, a step (a2) of selecting a training data group having a representative point closest to the additional spectral data among the N training data groups as a proximity training data group, and selecting a specific machine learning model that was learned using the proximity training data group, and a step (a3) of adding the additional spectral data to the proximity training data group to update the proximity training data group when the number of classes corresponding to the essential printing medium in the specific machine learning model is less than the upper limit value, and performing relearning on the specific machine learning model using the proximity training data group after updating.

According to the method, it is possible to perform class classification corresponding to the additional printing medium. In addition, since the relearning of the machine learning model is performed after the additional spectral data is added to the proximity training data group having a center of gravity closest to the additional spectral data of the additional printing medium, it is possible to enhance the accuracy of the class classification process by the machine learning model.

(6) In the above method, the step (a3) may include a step of deleting any spectral data about the any printing medium from the proximity training data group when a sum of the number of classes corresponding to the essential printing medium and the number of classes corresponding to the any printing medium in the specific machine learning model at a point in time before executing the step (a3) is equal to the upper limit value.

According to the method, since the any spectral data of the any printing medium is deleted from the proximity training data group, it is possible to enhance the accuracy of the class classification process without increasing the number of classes of the machine learning model.

(7) In the above method, the medium addition step may further include a step (a4) of creating a new machine learning model and performing learning on the new machine learning model using a new training data group including the additional spectral data and any spectral data about one or more any printing medium, when the number of classes corresponding to the essential printing medium in the specific machine learning model is equal to the upper limit value.

According to the method, it is possible to perform class classification corresponding to the additional printing medium. In addition, since the learning of the machine learning model is performed using the new training data group including the additional spectral data and the any spectral data, it is possible to enhance the accuracy of the class classification process.

(8) The above method may further include a medium exclusion step of excluding one printing medium to be excluded from the object to be subjected to the class classification process by one target machine learning model selected from the N machine learning models, in which the medium exclusion step may include a step (i) of updating the training data group by deleting spectral data about the printing medium to be excluded from a training data group used for learning of the target machine learning model, and a step (ii) of performing relearning on the target machine learning model using the updated training data group. According to the method, it is possible to exclude the printing medium from the object to be subjected to the class classification process of the machine learning model.

(9) In the above method, in the step (i), the spectral data about the printing medium to be excluded may be deleted from the training data group used for learning of the target machine learning model, and the any spectral data about one or more any printing medium may be added to update the training data group, when the number of classes of the target machine learning model obtained by excluding the printing medium to be excluded from the object to be subjected to the class classification process by the target machine learning model is less than a predetermined lower limit value.

According to the method, since the number of classes of the machine learning model can be set to the lower limit value or more, it is possible to prevent the accuracy of the class classification process from being excessively lowered.

(10) In the above method, one training data group used for learning of each machine learning model, spectral data excluded from the training data group, and spectral data added to the training data group may be managed to constitute the same spectral data group, the spectral data excluded from the training data group may be saved in a saving area of the spectral data group, and the spectral data added to the training data group may be selected from the spectral data saved in the saving area of the spectral data group.

According to the method, since the spectral data using as the training data is managed as spectral group data, it is possible to maintain a state equivalent to a state in which the N spectral data groups constituting the N training data groups are grouped by the clustering process.

(11) According to a second aspect of the present disclosure, there is provided a system for executing a discrimination process of a printing medium using a machine learning model. The system includes a memory that stores N machine learning models when N is an integer of 1 or more, and a processor that executes the discrimination process using the N machine learning models. Each of the N machine learning models is configured to discriminate a type of the printing medium by classifying input spectral data, which is a spectral reflectance of the printing medium, into any one of a plurality of classes. The processor is configured to execute a first process of acquiring target spectral data of a target printing medium and a second process of discriminating a type of the target printing medium by executing a class classification process of the target spectral data using the N machine learning models.

According to the system, since the class classification process is executed using the machine learning model, it is possible to accurately discriminate the printing medium having similar optical characteristics.

The present disclosure can also be realized in various aspects other than the above. For example, the present disclosure can be realized in an aspect of a computer program for realizing a function of a class classification device, a non-transitory storage medium in which the computer program is recorded, or the like.

What is claimed is:

1. A method for executing a discrimination process of a printing medium using a machine learning model, the method comprising:

a step (a) of preparing N machine learning model where N is an integer of 1 or more, in which each of the N machine learning model is configured to discriminate a type of the printing medium by classifying input spectral data, which is a spectral reflectance of the printing medium, into any one of a plurality of classes;

a step (b) of acquiring target spectral data which is a spectral reflectance of a target printing medium; and a step (c) of discriminating a type of the target printing medium by executing a class classification process of the target spectral data using the N machine learning model, wherein each training data group has a representative point representing a center of a spectral data group constituting each training data group, an upper limit value is set for the number of classes that is classified by any one machine learning model, a plurality of types of printing media, which are objects to be subjected to the class classification process by the N machine learning model, are classified into any one of an essential printing medium that is not excluded from the object to be subjected to the class classification process without a user's exclusion instruction and an any printing medium that is excluded from the object to be subjected to the class classification process without the user's exclusion instruction, the step (a) includes a medium addition step of adding a new additional printing medium, which has not been the object to be subjected to the class classification process by the N machine learning model, as the object to be subjected to the class classification process, and the medium addition step includes a step (a1) of acquiring a spectral reflectance of the additional printing medium as additional spectral data, a step (a2) of selecting a training data group having a representative point closest to the additional spectral data among the N training data groups as a proximity training data group, and selecting a specific machine learning model that was learned using the proximity training data group, and a step (a3) of adding the additional spectral data to the proximity training data group to update the proximity training data group when the number of classes corresponding to the essential printing medium in the specific machine learning model is less than the upper limit value, and performing relearning on the specific machine learning model using the proximity training data group after updating.

2. The method according to claim 1, wherein the step (a3) includes a step of deleting any spectral data about the any printing medium from the proximity training data group when a sum of the number of classes corresponding to the essential printing medium and the number of classes corresponding to the any printing medium in the specific machine learning model at a point in time before executing the step (a3) is equal to the upper limit value.

3. The method according to claim 1, wherein the medium addition step further includes a step (a4) of creating a new machine learning model and performing learning on the new machine learning model using a new training data group including the additional spectral data and any spectral data about one or more any printing medium, when the number of classes corresponding to the essential printing medium in the specific machine learning model is equal to the upper limit value.

4. A method for executing a discrimination process of a printing medium using a machine learning model, the method comprising:

preparing N machine learning models where N is an integer of 2 or more, in which each of the N machine learning models is configured to discriminate a type of the printing medium by classifying input spectral data, which is a spectral reflectance of the printing medium, into any one of a plurality of classes, and each of the N machine learning models is configured to have a number of classes different from that of other machine learning models among the N machine learning models;

acquiring target spectral data which is a spectral reflectance of a target printing medium;

discriminating a type of the target printing medium by executing a class classification process of the target spectral data using the N machine learning models;

performing printing by a printer using the target printing medium according to print setting selected according to the type of the target printing medium; and excluding one printing medium to be excluded from types of printing media to be subjected to the class classification process by one target machine learning model selected from the N machine learning models, wherein the excluding includes a step (i) of updating the training data group by deleting spectral data about the printing medium to be excluded from a training data group used for learning of the target machine learning model, and a step (ii) of performing relearning on the target machine learning model using the updated training data group, in the step (i), the spectral data about the printing medium to be excluded is deleted from the training data group used for learning of the target machine learning model, and additional spectral data about one or more additional printing media is added to update the training data group, when the number of classes of the target machine learning model obtained by excluding the printing medium to be excluded from types of printing media to be subjected to the class classification process by the target machine learning model is less than a predetermined lower limit value.

5. The method according to claim 4, wherein the discriminating of the type of the target printing medium includes discriminating a medium identifier indicating the type of the target printing medium according to a result of the class classification process of the target spectral data, and the method further comprises:

selecting the print setting according to the medium identifier.

6. The method according to claim 4, wherein, learning of the N machine learning models is performed using corresponding N training data groups, and N spectral data groups constituting the N training data groups are in a state equivalent to a state in which the N spectral data groups are grouped into N groups by a clustering process.

7. A method for executing a discrimination process of a printing medium using a machine learning model, the method comprising:

preparing N machine learning models where N is an integer of 2 or more, in which each of the N machine learning models is configured to discriminate a type of the printing medium by classifying input spectral data, which is a spectral reflectance of the printing medium, into any one of a plurality of classes, and each of the N machine learning models is configured to have a number of classes different from that of other machine learning models among the N machine learning models;

acquiring target spectral data which is a spectral reflectance of a target printing medium;

discriminating a type of the target printing medium by executing a class classification process of the target spectral data using the N machine learning models;

performing printing by a printer using the target printing medium according to print setting selected according to the type of the target printing medium; and excluding one printing medium to be excluded from types of printing media to be subjected to the class classification process by one target machine learning model selected from the N machine learning models, wherein the excluding includes a step (i) of updating the training data group by deleting spectral data about the printing medium to be excluded from a training data group used for learning of the target machine learning model, and a step (ii) of performing relearning on the target machine learning model using the updated training data group, one training data group used for learning of each machine learning model, spectral data excluded from the training data group, and spectral data added to the training data group are managed to constitute the same spectral data group, the spectral data excluded from the training data group is saved in a saving area of the spectral data group, and the spectral data added to the training data group is selected from the spectral data saved in the saving area of the spectral data group.

8. The method according to claim 7, wherein the discriminating of the type of the target printing medium includes discriminating a medium identifier indicating the type of the target printing medium according to a result of the class classification process of the target spectral data, and the method further comprises:

selecting the print setting according to the medium identifier.

9. The method according to claim 7, wherein, learning of the N machine learning models is performed using corresponding N training data groups, and N spectral data groups constituting the N training data groups are in a state equivalent to a state in which the N spectral data groups are grouped into N groups by a clustering process.

* * * * *